April 9, 1963   W. J. CALDWELL   3,084,879
APPARATUS FOR TAPING COILS
Filed Oct. 24, 1958   19 Sheets-Sheet 1
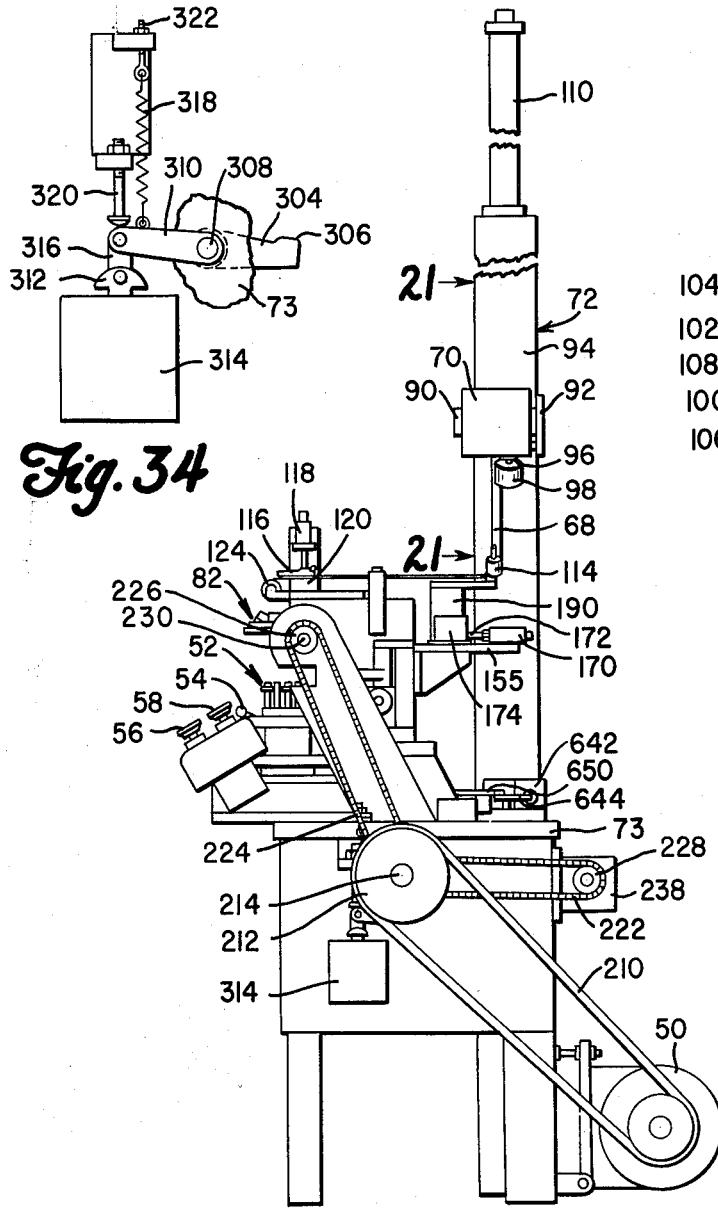
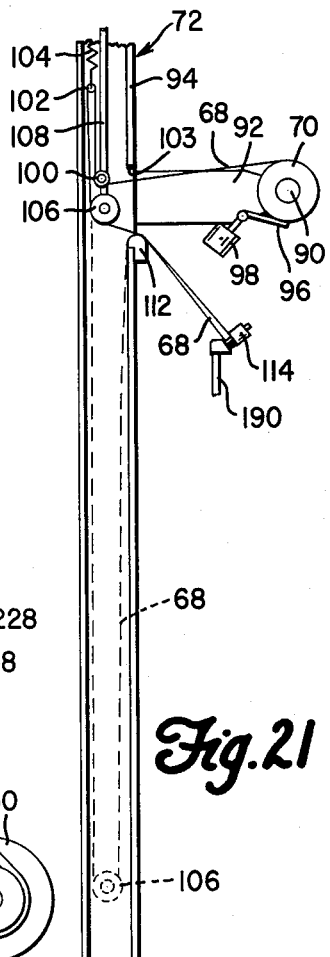
Fig. 34
Fig. 1
Fig. 21
INVENTOR.
WASHINGTON J. CALDWELL
BY
Falvey, Souther & Stoltenberg
ATTORNEYS April 9, 1963 W. J. CALDWELL 3,084,879
APPARATUS FOR TAPING COILS
Filed Oct. 24, 1958 19 Sheets-Sheet 2
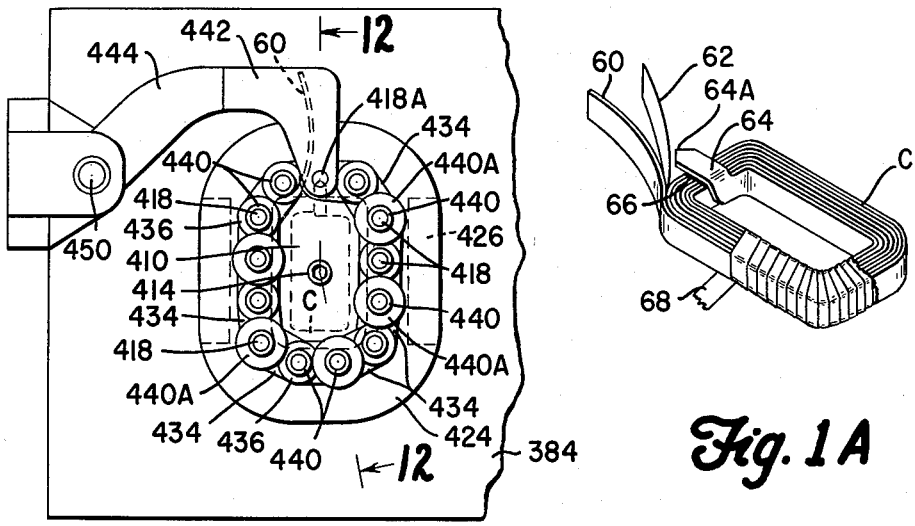
Fig. 1A
Fig. 13
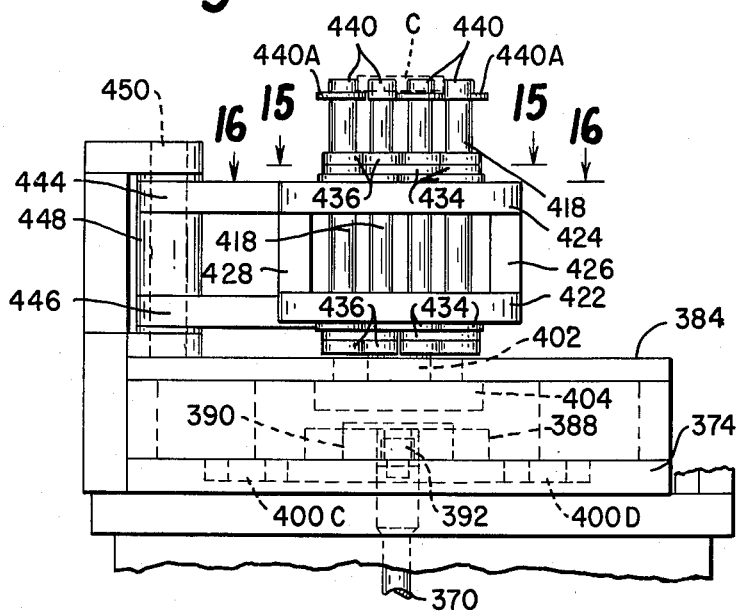
Fig. 14
INVENTOR.
WASHINGTON J. CALDWELL
BY
ATTORNEYS April 9, 1963 W. J. CALDWELL 3,084,879
APPARATUS FOR TAPING COILS
Filed Oct. 24, 1958 19 Sheets-Sheet 3

INVENTOR.
WASHINGTON J. CALDWELL
BY
Falvey, Souther & Stoltenberg
ATTORNEYS

INVENTOR.
WASHINGTON J. CALDWELL
BY
*Falvey, Souther & Stoltenberg*
ATTORNEYS

April 9, 1963   W. J. CALDWELL   3,084,879
APPARATUS FOR TAPING COILS
Filed Oct. 24, 1958   19 Sheets-Sheet 5

INVENTOR.
WASHINGTON J. CALDWELL
BY
Falvey, Souther & Stoltenberg
ATTORNEYS

INVENTOR.
WASHINGTON J. CALDWELL

INVENTOR.
WASHINGTON J. CALDWELL

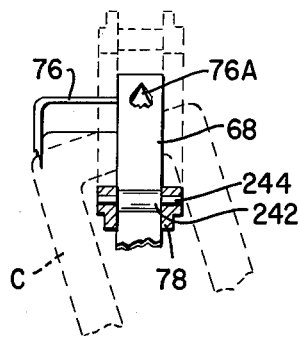
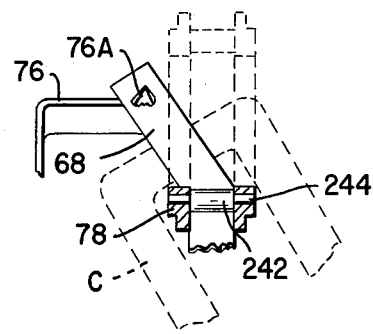
Fig. 55  Fig. 56
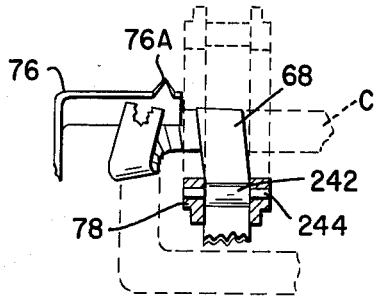
Fig. 57
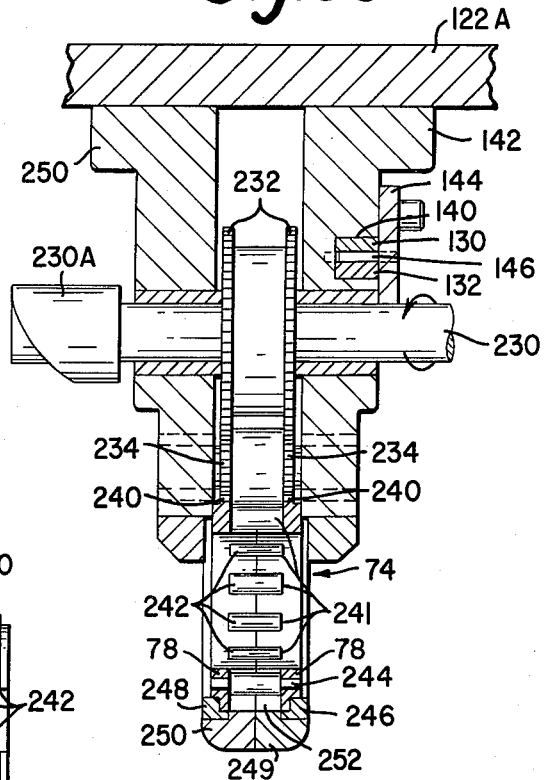
Fig. 9
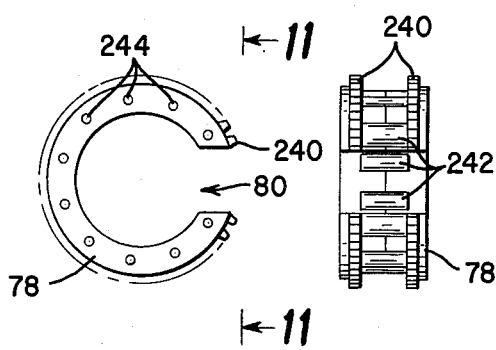
Fig. 10  Fig. 11
*INVENTOR.*
WASHINGTON J. CALDWELL
BY
Falvey, Souther & Stoltenberg
ATTORNEYS April 9, 1963   W. J. CALDWELL   3,084,879
APPARATUS FOR TAPING COILS
Filed Oct. 24, 1958   19 Sheets-Sheet 10
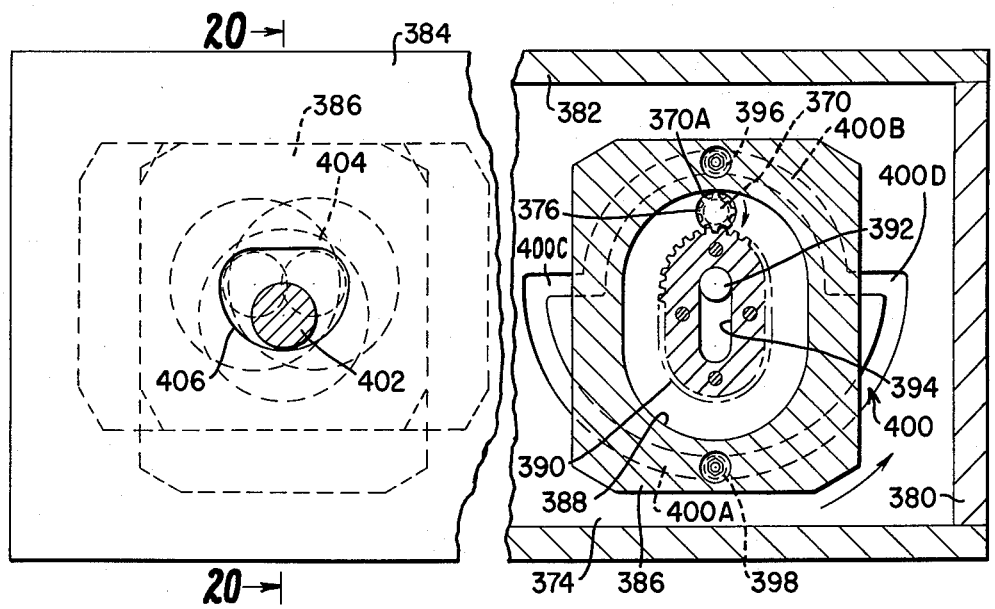
Fig. 19   Fig. 18
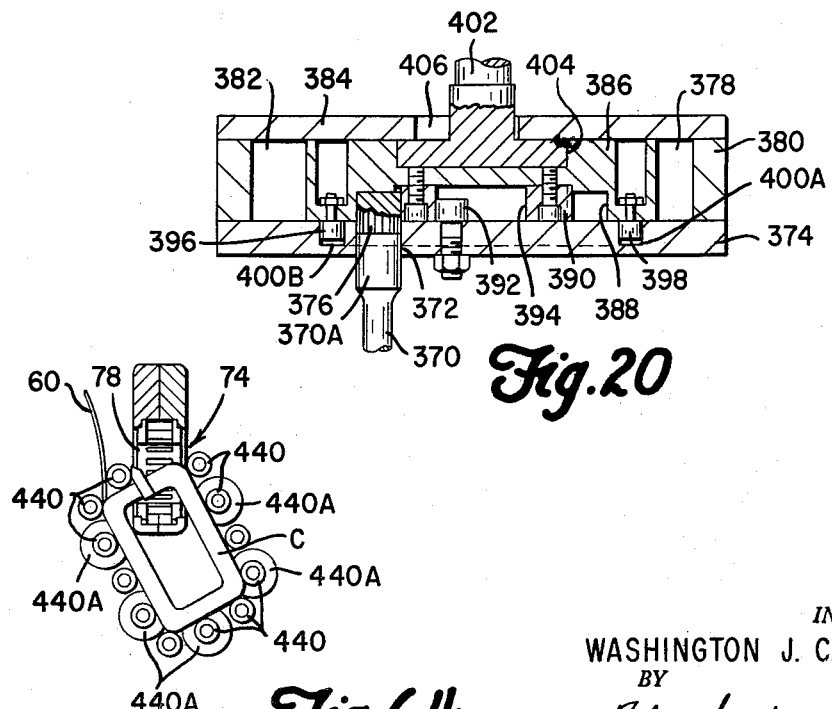
Fig. 20
Fig. 64
INVENTOR.
WASHINGTON J. CALDWELL
BY
Falvey, Souther & Stoltenberg
ATTORNEYS

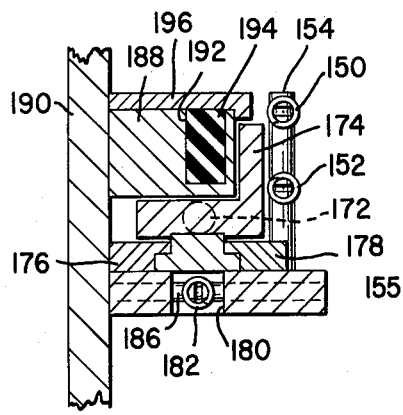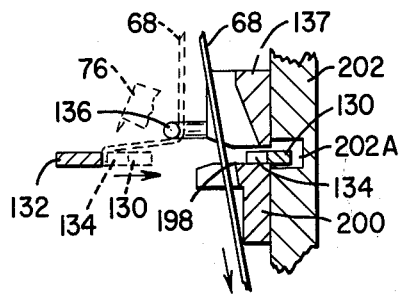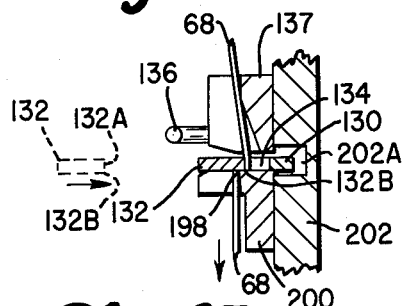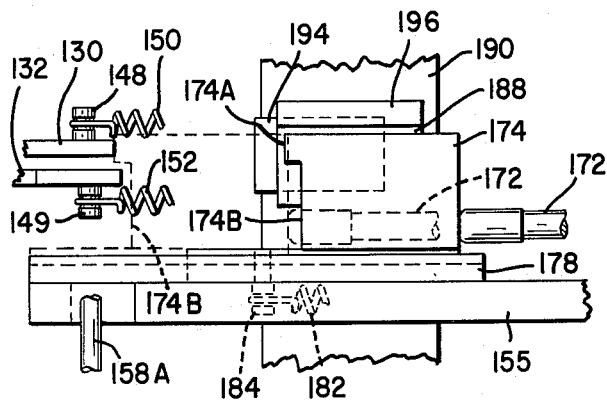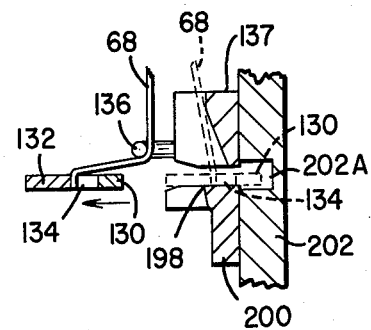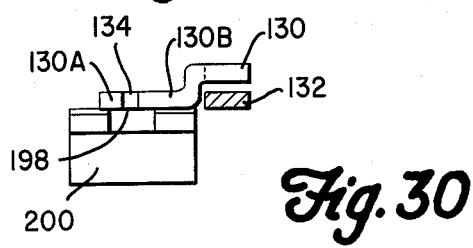

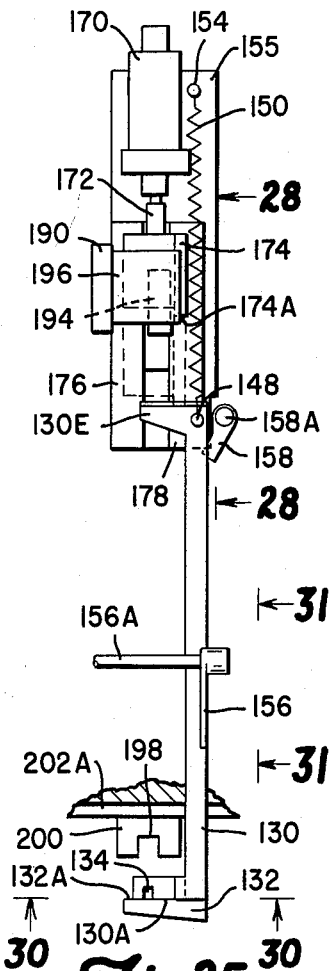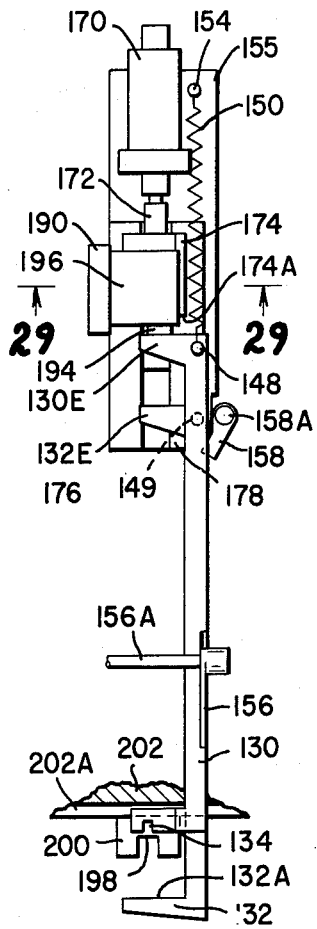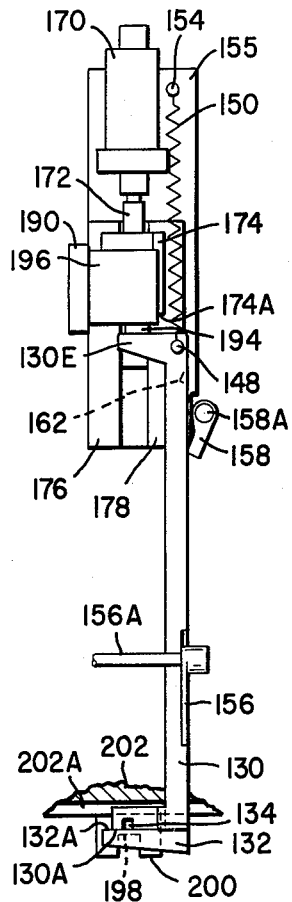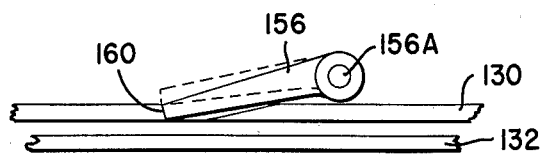

April 9, 1963 W. J. CALDWELL 3,084,879
APPARATUS FOR TAPING COILS
Filed Oct. 24, 1958 19 Sheets-Sheet 13

INVENTOR.
WASHINGTON J. CALDWELL
BY
Falvey, Souther & Stoltenberg
ATTORNEYS

April 9, 1963 W. J. CALDWELL 3,084,879
APPARATUS FOR TAPING COILS
Filed Oct. 24, 1958 19 Sheets-Sheet 14

INVENTOR.
WASHINGTON J. CALDWELL
BY
ATTORNEYS

April 9, 1963 W. J. CALDWELL 3,084,879
APPARATUS FOR TAPING COILS
Filed Oct. 24, 1958 19 Sheets-Sheet 15

INVENTOR.
WASHINGTON J. CALDWELL
BY
Falvey, Souther & Stoltenberg
ATTORNEYS

INVENTOR.
WASHINGTON J. CALDWELL
BY
Falvey, Souther & Stoltenberg
ATTORNEYS

INVENTOR.
WASHINGTON J. CALDWELL
BY
*Falvey, Souther & Stollenberg*
ATTORNEYS

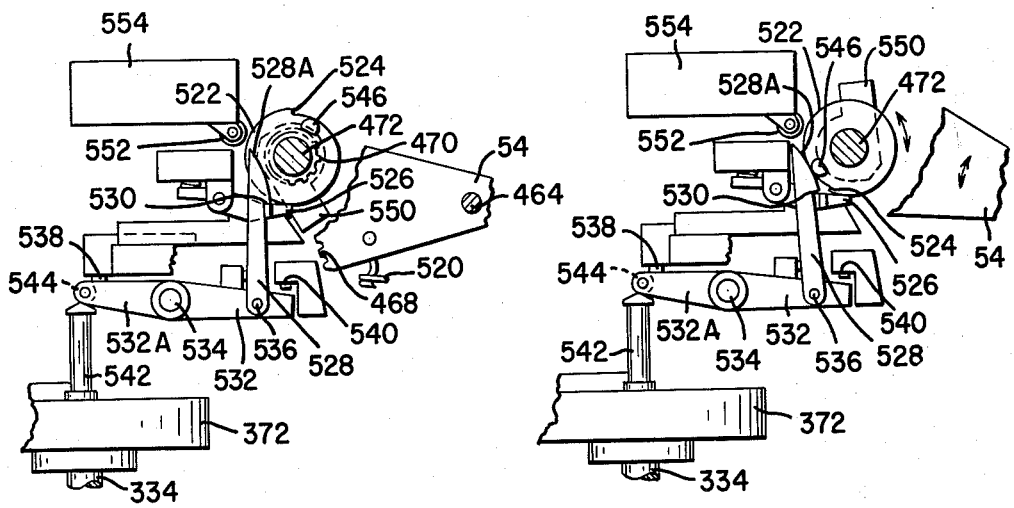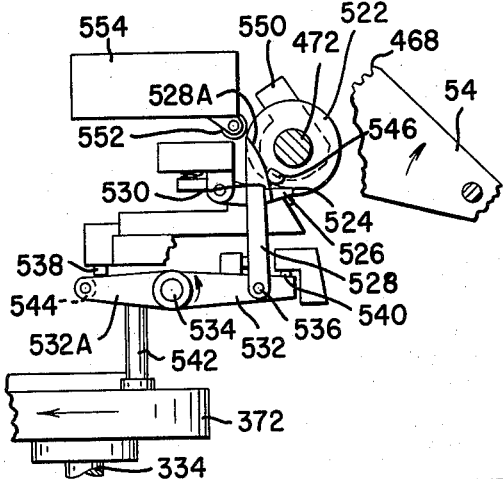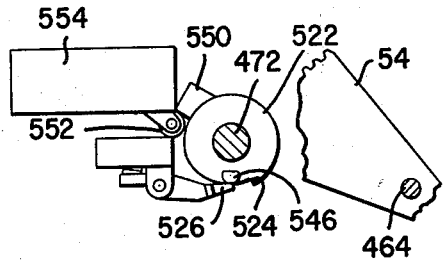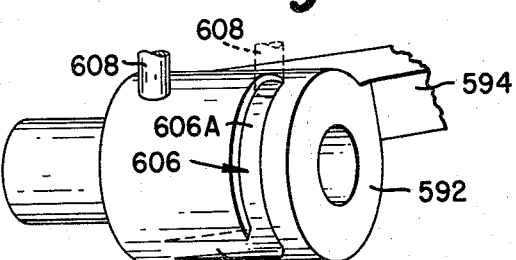

April 9, 1963 W. J. CALDWELL 3,084,879
APPARATUS FOR TAPING COILS
Filed Oct. 24, 1958 19 Sheets-Sheet 19
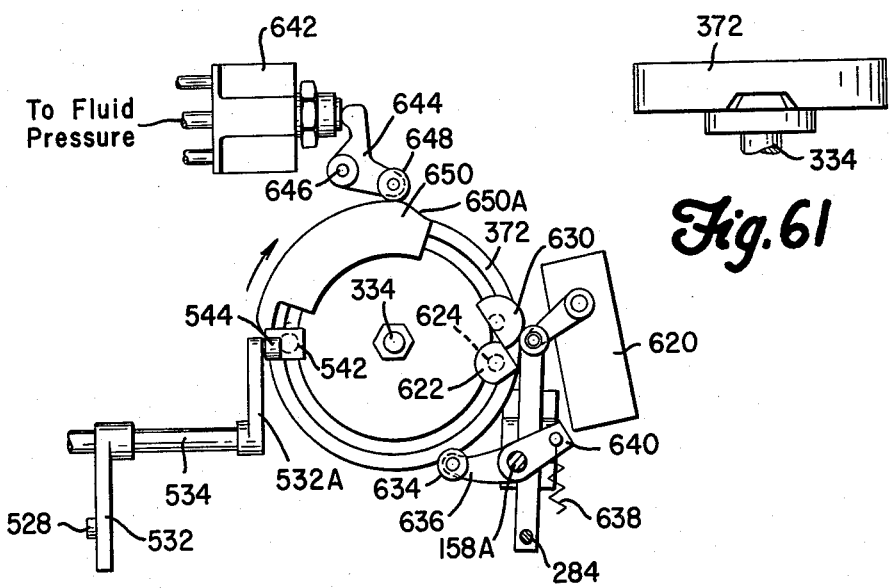
Fig. 61
Fig. 58
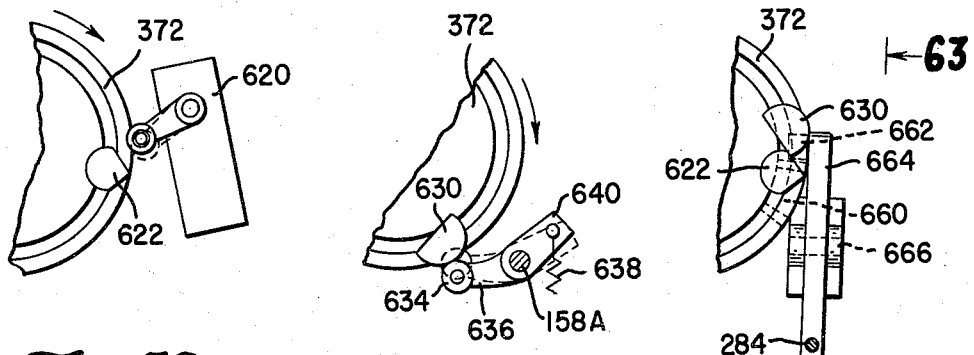
Fig. 59 Fig. 60 Fig. 62
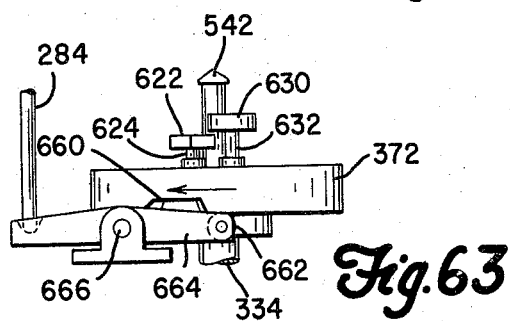
Fig. 63
INVENTOR.
WASHINGTON J. CALDWELL
BY
Falvey, Souther & Stoltenberg
ATTORNEYS United States Patent Office 3,084,879
Patented Apr. 9, 1963

3,084,879
APPARATUS FOR TAPING COILS
Washington J. Caldwell, Toledo, Ohio, assignor to The Electric Auto-Lite Company, Toledo, Ohio, a corporation of Ohio
Filed Oct. 24, 1958, Ser. No. 769,386
14 Claims. (Cl. 242—6)

This invention relates to taping machines, more particularly to machines for positioning flexible insulating tapes on coils of non-circular conformation for the purpose of insulating these coils for use in electrical devices such as motors and generators or the like.

The problem of insulating coils for use with electrical instrumentalities, particularly when the coils have a non-circular conformation for use with the pole shoes of electric starting motors in the automotive field, has long been a problem with manufacturers of equipment of this type. For many years a cotton tape has been utilized for this purpose, and even though the operation has been partially mechanized, manual manipulation of the coil was necessary by an operator and a very high degree of manual skill and dexterity was necessary to place an even layer of cotton insulating tape on coils of this type. Often training periods of six months or more were necessary to give an operator the degree of skill necessary to obtain an acceptable insulating layer on coils with a fair degree of speed, so that the cost was maintained at acceptable levels. This operation also required a high degree of concentration, so that the job was tiring to an operator with the result that the job was unpopular in production lines and the workers would quit the job as quickly as possible to acquire a new job on production lines where the degree of skill and the need for concentrated effort was not so burdensome. This had the end result that the labor turnover in taping jobs was large and most of the operators were not working at this job sufficiently long to acquire the necessary skill, so that the results were not satisfactory and far too costly.

An attempt has been made in the industry to obviate this undesirable situation by using a liquid type of insulation which could be applied by a dipping step and subsequently baked and hardened. This solution was partially successful, but still was too expensive, due to the high initial cost of the materials, and also due to the many rejects arising from uneven application of the insulating materials.

The present invention contemplates the provision of a machine which substantially mechanizes the taping step using the cotton tape as insulating material. The machine of the type disclosed removes the operation of taping coils from a highly skilled manipulation, so that an operator, after a very short period of training, can apply the insulating tape to coils with uniform results and at a speed which substantially lowers the cost of the insulating step. At the same time, the use of the machine obviates the labor problem by making the taping job on the production lines one that requires a much lower degree of skill and concentration, so that an average operator can perform it successfully with a reasonable amount of effort. The job becomes one of loading and unloading coils to and from the machine, with the cotton tape being automatically positioned on the coil by the machine. The use of the machine, which places an even layer of cotton tape on each coil, uniformly from coil to coil, saves a considerable amount of tape to thereby further reduce the cost, not to mention a better and more uniform insulation for the coils.

It is, therefore, a principal object of this invention to provide a machine which automatically wraps a flexible insulating tape about a toroidal coil which is non-circular in conformation.

It is a further object of this invention to provide a method and a machine for taping electric coils of toroidal, non-circular shape, wherein the tape is applied in an even layer with uniform overlap, and wherein the tape is applied in close proximity to the terminal leads.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate parts in the several views.

Referring to the drawings:

FIGURE 1 is an elevational view of the machine as a whole.

FIGURE 1A is a perspective view of a coil on which the machine is adapted to wind tape as an insulation layer.

FIGURE 9 is an elevational view taken along the line 9—9 of FIGURE 6.

FIGURES 10 and 11 are views of a portion of the winding mechanism.

FIGURE 13 is a plan view of the coil holding mechanism.

FIGURE 14 is a view similar to FIGURE 12.

FIGURES 18 and 19 are plan views partly in section of the mechanism driving the coil holding device.

FIGURE 20 is an elevational view partly in section taken along the line 20—20 of FIGURE 19.

FIGURE 21 is an elevational view taken along the line 21—21 of FIGURE 1.

FIGURES 22, 23 and 24 are elevational views of the mechanism cooperating with the tape for the purpose of gripping its free end.

FIGURES 25, 26 and 27 are elevational views of the mechanism operating the device shown in FIGURES 22, 23 and 24 as shown in its varying positions.

FIGURE 28 is an elevational view of a machine element taken along the line 28—28 of FIGURE 25.

FIGURE 29 is an elevational view in section of a machine element taken along the line 29—29 of FIGURE 26.

FIGURE 30 is an elevational view partly in section taken along the line 30—30 of FIGURE 25.

FIGURE 31 is an elevational view of a locking element taken along the line 31—31 of FIGURE 25.

FIGURE 34 is an elevational view of a portion of the mechanism driven by a solenoid.

FIGURE 48A is a perspective view of the device shown in FIGURE 48.

FIGURES 51, 52 and 53 are elevational views partly in section of a portion of the control mechanism in varying positions.

FIGURE 54 is an elevational view of a portion of the mechanism shown in FIGURE 53 in another operative position.

FIGURES 55, 56 and 57 are plan views of a portion of the machine which cooperates with the free end of the tape in varying operative positions.

FIGURE 58 is a plan view of a portion of the control mechanism.

FIGURES 59, 60 and 62 are plan views of a portion of the control mechanism shown in varying positions.

FIGURE 61 is an elevational view of the rotating cam member shown in FIGURE 58.

FIGURE 63 is an elevational view taken along the line 63—63 of FIGURE 62, and

FIGURE 64 is a plan view showing the opening phase of the winding cycle with the coil mounted in the coil holding mechanism in cooperating relation with the winding element.

Figure 2:
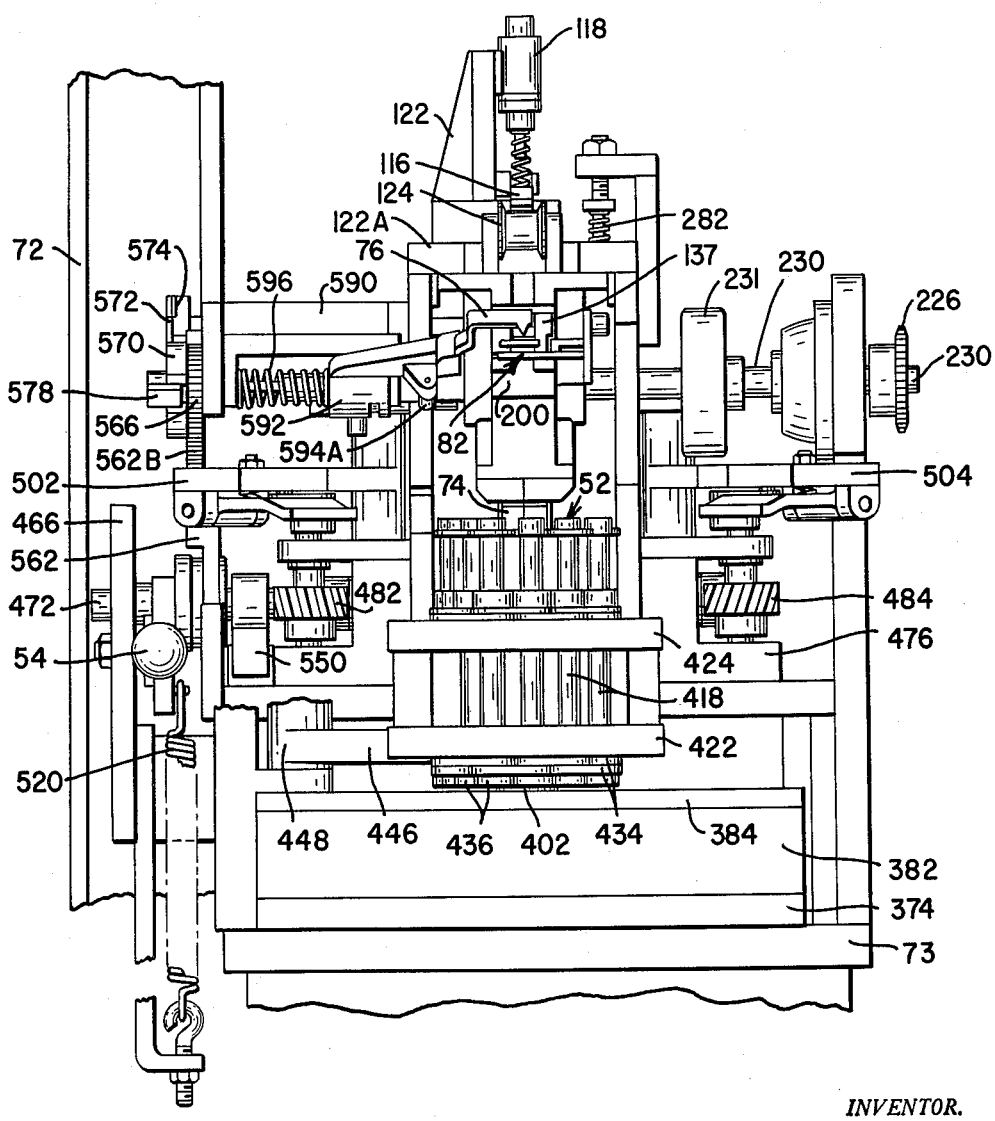
FIGURE 2 is a front elevational view of the machine.

Referring to FIG. 1 of the drawings, a side view of the machine is shown with an electric motor 50 being shown to supply power through suitable driving connections for the operation of the machine. An operator of the machine is seated on the left side of the machine, so that it is convenient to position coils C of toroidal conformation (FIG. 1A) in a holding means 52 of the machine. After the machine is closed by actuation of the handle 54, the operator actuates the switch button 56 which begins the taping cycle by the application of tape, as shown partially in FIG. 1A.

The coil C, to which insulating tape is to be applied, as shown in FIG. 1A, is wound from copper strip material 60, insulated by a paper strip 62 positioned between the turns of the coil. The inner terminal end 64 is bent upwardly and outwardly to overlie the main body of the coil, as shown, and is preferably insulated by a strip of paper 66 positioned between the overlying parts. The coil is relatively rigid in form and will allow considerable force to be applied to it. The tip 64A of the terminal end is pointed to aid in piercing a flexible cotton insulating tape 68 when the tape is wound over it, all as will be described hereinafter.

The flexible insulating tape 68, preferably of cotton braid material, although other insulating materials such as paper, plastic and the like may be used, is supplied to the machine in the form of large rolls 70 (FIG. 1), from which it passes into an unreeling device 72 affixed to frame 73 and thence in the upper portion of the machine where a measured length of tape is supplied to a taping head 74 (FIG. 6) by a threading device 76, also controlled by the manual handle 54, all to be further described hereinafter.

Figure 6:
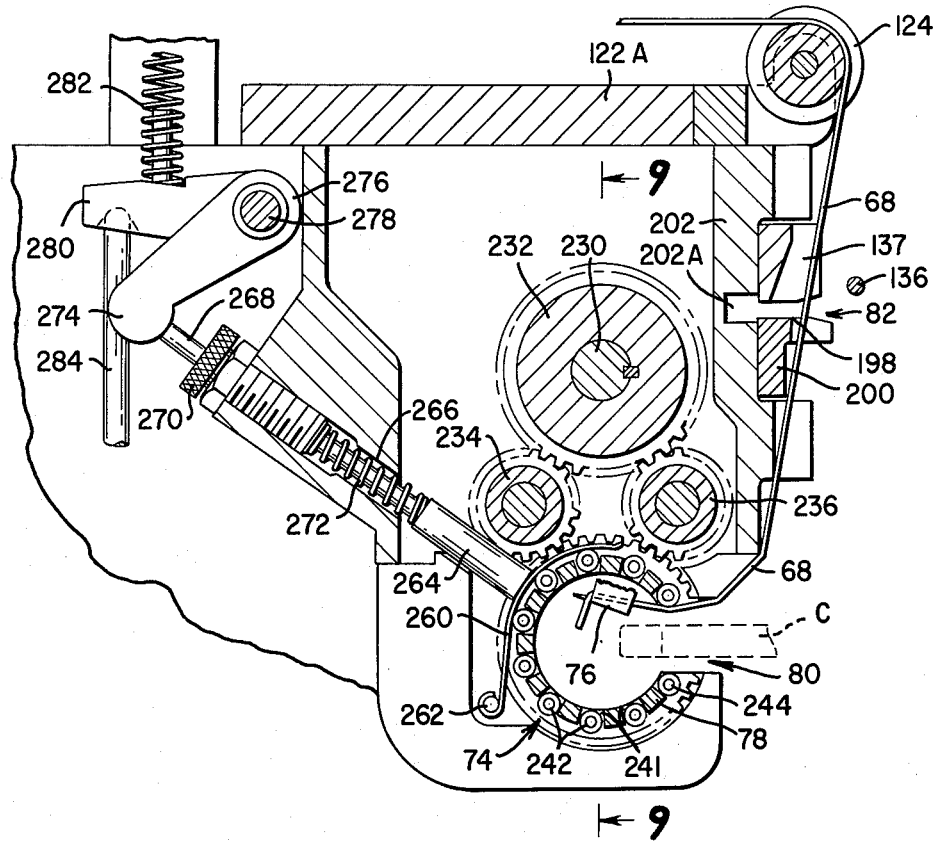
FIGURE 6 is an elevational view partly in section of the winding element.
Figures 7, 8:
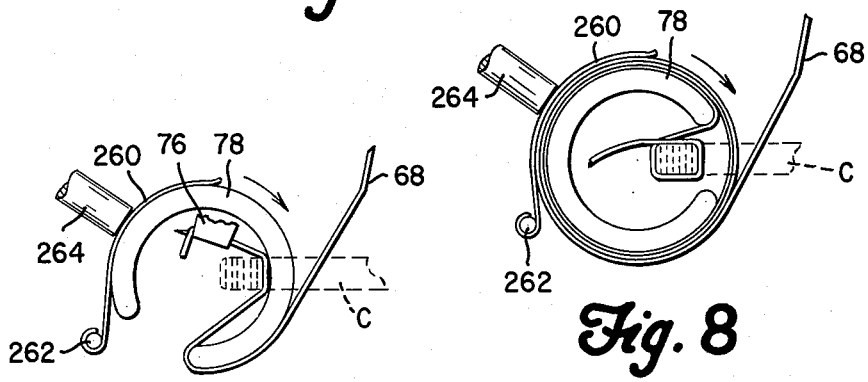
FIGURE 7 is an elevational view of a portion of the winding element showing the beginning of the winding cycle.
FIGURE 8 is a view similar to FIGURE 7 illustrating a more advanced phase of the winding cycle.

The taping head 74 is of the type generally disclosed in Patent No. 2,793,817, and has been in general use for many years in connection with the taping of toroidal coils. Similar taping heads have been used in manual taping operations where an operator holds and advances the coil by his hands during the taping operation by the head. The head 74 houses a rotating shuttle 78 (FIGS. 9, 10 and 11), having an opening 80, through which the coil side is inserted at the beginning of the taping cycle (FIG. 6). The tape 68, being also carried through the opening 80 in the shuttle 78 by the threading device 76, engages both the coil side and the outside of the shuttle 78 for a simultaneous wrapping of tape on the coil and a storing of tape on the shuttle, as shown in FIGS. 7 and 8. When the predetermined length of tape 68 has passed the cutter 82 (FIG. 6), the tape is cut off and stored on the exterior of the shuttle 78, where it is gradually applied to the coil side by the continued rotation of the shuttle. In the meantime, the coil is being moved through the taping head at a substantially uniform rate by a control mechanism to be described hereinafter located in the machine positioned relatively below the tapng head 74, to apply the tape in an even layer on the sides of the toroidal coil C. The winding of the tape 68 begins on the coil C behind the terminal 64 and continues in a clockwise direction around the sides of the coil C until the pointed terminal end 64 approaches the winding position at the taping head 74, at which time sufficient tension is applied to the tape 68, so that the point will pierce the tape to provide insulation behind the terminal. The outer terminal end 60 of the coil C will, in the meantime, have been bent transversely to the inner terminal 64. This completes the winding cycle with the machine stopping automatically and the operator will open the machine by actuating the handle 54, remove the already tape-wound coil from the holder 52, replace it with a new coil, and begin a new cycle.

Tape Control and Feeding Mechanisms

The flexible insulating tape 68 is supplied to the machine in large rolls 70, as already mentioned. The bobbin of the roll 70 is rotatably mounted on a spindle 90 (FIG. 21) affixed on a bracket 92 mounted on the side of casing 94 of the unreeling mechanism 72 in any suitable manner, so that the roll 70 may rotate freely when the tape 68 is pulled therefrom. To prevent overrunning of the roll, a friction brake 96 is supplied also mounted on the bracket 92, which may be in the form of a pivoted bellcrank, one arm having a weight 98 attached to its while the other arm drags on the tape positioned on the roll. From the roll, the tape 68 is lead to a fixed roller 100 mounted in the casing 94 through an opening 103 in the casing, then to a second roller 102 affixed to the end of a helical spring 104 whose other end is anchored above the fixed roller, so that a resilient bias is provided for the tape to absorb shock when the tape is being unreeled by a third roller 106 affixed to the end of piston rod 108, which is adapted to be driven downwardly by air cylinder 110 mounted at the top end of the casing 94. From the roller 106, the tape proceeds over a polished head 112 mounted on the lower edge of the opening 103 on the inner side of the casing, from which it proceeds downwardly to guide roller 114 to move horizontally into the machine toward the holder 52 (FIG. 1).

The movable roller 106 is actuated by the air cylinder 110 during the period when the holder 52 is quiescent, being thrust downwardly by the roller into the lower part of the casing 94 so as to form a large bight in the tape 68 which is of sufficient size to provide the necessary length of tape needed to wrap the next coil C to be placed in the holder 52 by the operator. The forward end of the tape 68 ahead of the roller 114 is locked in position by brake 116 actuated by air cylinder 118 against anchor block 120, so that the downward stroke of the roller 106 will pull the tape from the storage roll 70 to form the bight preparatory for the next taping cycle. The control mechanism to actuate the air cylinder 110 in both the up and down stroke will be described further hereinafter. The second small air cyclinder 118 provided for the brake 116 to actuate the brake at the right moment, is controlled and timed by the same mechanism. The cylinder 118 is suitably mounted on bracket 122, as shown in FIG. 2.

From the brake element 116, the flexible tape 68 passes over roller 124 into the cutter mechanism 82 (FIG. 6), already generally referred to, where the free end of the tape is pierced by the point of the threading device 76 and carried down into the shuttle element 78 of the taping head 74 by the manual actuation of the handle 54 when the machine is closed. The tape end is then in position for the beginning of the taping cycle. The brake element has, in the interim, been released to allow movement of the tape through it. The roller 124 is suitably mounted for rotation on the forward side of plate 122A, on which the bracket 122 is also mounted.

Referring to FIG. 22, the threading device 76 is shown in phantom in its position just prior to piercing the free end of the tape 68, which, at that instant, is being held between two elements 130 and 132 of the cutter device 82. The element 132 is provided with a slot 134, through which the point of the threading device 76 is adapted to pass when the tape is being pierced, the tape being guided by a staple 136 mounted in a slotted guide block 137, so that the tape is held in substantially a horizontal position, as shown, preparatory to the piercing operation by the threading device 76. The threading device then carries the pierced end of the tape 68 into the taping head, as already described, and shown in FIG. 6. At the instant of piercing of the tape, the element 130 retreats from its contactual relation with the element 132, as shown in phantom in FIG. 22, to its position shown in solid lines in the same figure. The tape 68 is thereby released and passes through the cutting device as shown.

The elements 130 and 132 are slidably mounted by longitudinal movement in a slot 140 in a bracket 142 of a pair mounting the taping head 74 to the frame (FIG. 9) being held in position in the slot 140 by plate 144 bolted to the bracket. A spacer plate 146 is positioned between the elements, being also held in position by the plate 144 by suitably engaging tongues and slots. At their inner ends each of the elements 130 and 132 is provided with a stud 148 and 149 (FIG. 28) which are engaged by springs 150 and 152 anchored at their other ends to post 154 (FIG. 29) affixed to plate 155 in a manner to bias both elements rearwardly. The elements are held in their forward position by latches 156 and 158, which engage faces 160 (FIG. 31) and 162 (FIG. 27) in the elements 130 and 132 respectively. The latches are so related to each other and their notches that the forward face 130A of the element 130 is resiliently clamped against the rearward face 132A of the lower element 132 when both are in their mostforwardly position, so that the free end of the tape 68 will be firmly clamped between the two faces on the elements, both being positioned in the same plane by having the transverse part 130B of the element 130, on which the face 130A is positioned, bent downwardly as shown in FIG. 30.

To urge the elements 130 and 132 forwardly against the bias of springs 150 and 152, an air cylinder 170 (FIG. 1) is provided, which is mounted on plate 155. The piston rod 172 of the air cylinder is adapted to abut against the rear end of a slidably mounted actuator 174 (FIG. 28) adapted to be guided by rails 176 and 178 (FIG. 29) also affixed to the plate 155, which is provided with a slot 180 immediately below the actuator 174 in which is positioned a helical spring 182, acting between a stud 184 mounted on the actuator and an anchor pin 186 affixed to the plate so as to provide a spring bias urging the actuator 174 to the rear carrying with it the piston rod 172 of the air cylinder 170. The actuator 174 is angular in form and partially embraces an abutment block 188 positioned in spaced relation with the rails 176 and 178 on a vertical plate 190 on which is also mounted plate 155, by any convenient means. The abutment block 188 is provided with an open recess 192 in which is seated a rubber bumper 194, being held in the recess 192 under compression by an upper plate 196 affixed to the block 188 in any convenient manner. The bumper 194 extends beyond the forward face of the block 188 and is adapted to cooperate with the transverse end pieces 130E and 132E of the elements 130 and 132, when the latches 156 and 158 are released, whereby the bias of springs 150 and 152 snaps the elements backwardly to hit against the resilient rubber bumper 194.

Returning to the actuator 174, its forward face 174A is adapted to contact the end of the element 130 but not that of element 132, the actuator being provided with a clearance 174B to avoid contact (FIG. 28). As the piston rod 172 moves forwardly, it pushes the actuator 174 before it which, in turn, pushes element 130 in the same direction by its contact with surface 174A. With the forward movement of the element 130, its forward face 130A contacts the rear face 132A of the element 132 (FIG. 23 and FIG. 27) with the free end of the tape 68 between them, both elements continuing to move forward until the latch 158 is overrun and the latch 156 catches to hold the parts, as shown in FIG. 22, the element 130 being shown in phantom. The free end of the tape 68 will still be resiliently held between the elements, where it will continue to be held until it is pierced by the threading device 76 as already described, at which instant the latch 156 will be released to allow the element to snap back against the bumper (FIG. 22 and FIG. 26), while latch 158 will engage slot 162 to hold element 132 in its advanced position (FIG. 22 and FIG. 26). The element 132 remains in this advanced position during a part of the taping cycle until the predetermined length of tape has been wound in part on the coil C and stored in part in the taping head 78. At that instant, the latch 158 is released and the tape will be cut by the snapping back of the element 132 by the bias of spring 152 against the bumper 194.

The cutting of the tape 68 occurs by the cooperative shearing relation between the lower sharpened edge 132B of the rearward face 132A of the element 132, and a sharpened edge 198 of a slotted shear block 200 mounted below the slotted guide block 137 on the forward face of vertical plate 202. A clearance slot 202A is provided in the front face of the plate 202 for the cooperating parts, as shown in FIG. 23. The control and timing elements for latches and other elements will be described hereinafter.

The latches 156 and 158 are mounted for rotation on shafts 156A and 158A respectively which cooperate with the control and timing devices.

Taping Device and Driving Means

Figure 32:
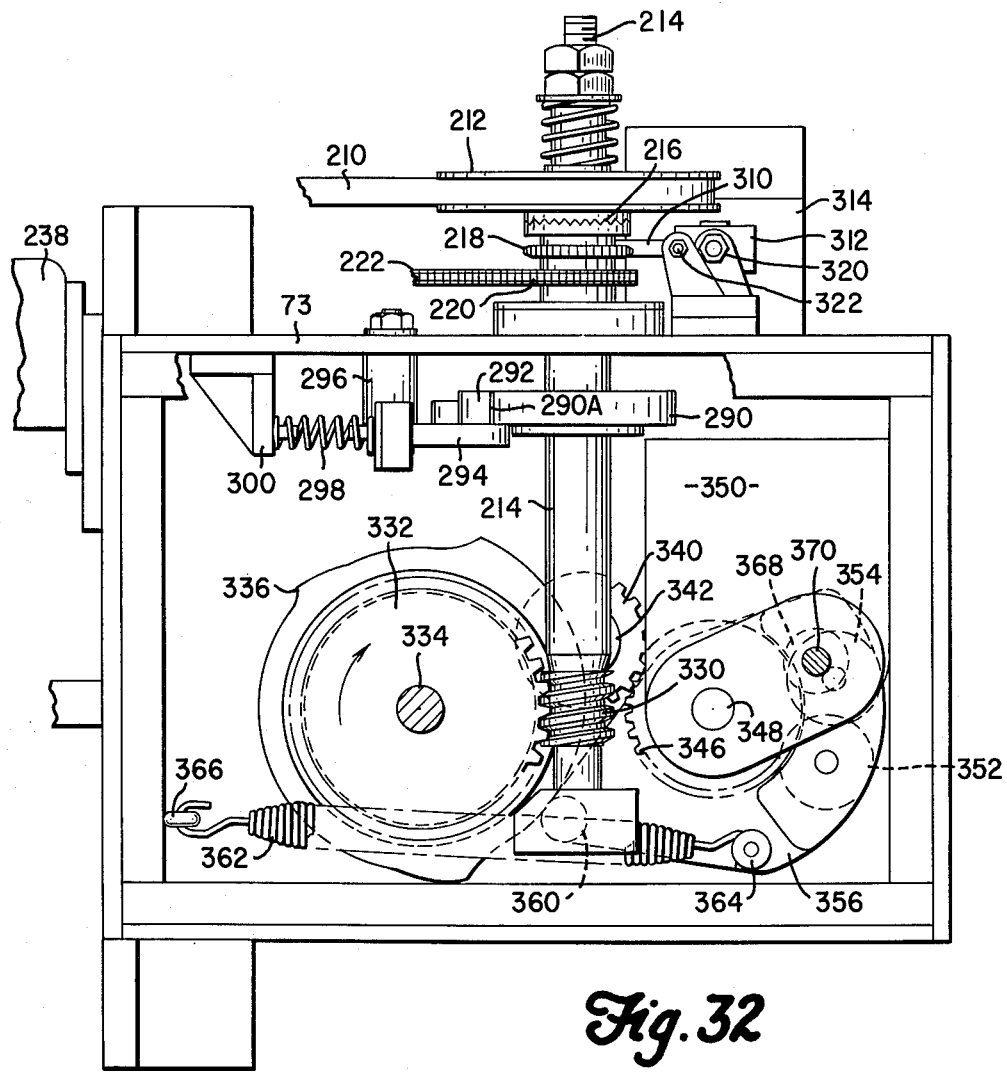
FIGURE 32 is a plan view partly in section of the main driving mechanism.

Referring to FIG. 1 and FIG. 32, the electric motor 50 adjustably mounted on the lower part of the frame 73, drives, by means of belt 210, a drive pulley 212 which is adapted to drive a shaft 214 through an adjustable jaw clutch 216. The shaft 214 is suitably journaled in bearings in the frame, and is provided with a pair of sprockets 218 and 220, which drive by means of chains 222 and 224, a second pair of sprockets 226 and 228. The sprocket 226 is affixed to shaft 230 which is provided with a hand wheel 231 and adapted to drive the taping head 74 (FIG. 2) through suitable double gears 232, 234, and 236 (FIGS. 6 and 9). Sprocket 228 drives a braking device 238 to prevent coasting of the motor 50 when the power circuit thereto is broken.

The taping head 74 (FIGS. 6 and 9) has a rotating shuttle 78 which has a slot opening 80, through which the coils C are positioned into the shuttle. The shuttle is rotated by a broken double gear 240 driven by the pair of double gears 234 and 236. The barrel of the shuttle 78 is provided with apertures 241 in which spaced rollers 242 are journaled on pins 244 positioned in suitable aligned apertures in the barrel. The barrel is adapted to rotate on a pair of broken ring bearing members 246 and 248 positioned in a pair of brackets 249 and 250 affixed to the bracket 142 and plate 122A in any suitable manner as by bolting. The shaft 230 and the journals for double gears 232 and 234 are also positioned in the bracket 142. A clearance 252 is provided between the rollers 242 and the bracket to store the winding tape 68 during the winding phase.

The details of construction of this taping device may vary widely, the unit, as a whole, being available commercially.

On the rear side of the shuttle 78, substantially diametrically opposed to normal position of the opening 80, a spring-braking member 260 is provided which contacts the tape which is stored around the shuttle during the winding cycle, so that additional tension may be applied to the tape during the closing period of the winding phase, particularly when it is essential for the sharpened tip 64A of the terminal 64 of the coil C (FIG. 1A) to pierce the tape 68 as has already been described. The brake consists of a band of metal embracing the shuttle 78 in part, which has its one end anchored and pivoted on pin 262 affixed to an adjacent bracket portion. Adjacent a central location, the band 260 is adapted to be contacted on its exterior surface by an adjustable spring-urged pin 264 (FIG. 6) journaled for longitudinal movement in aperture 266 in the bracket 142. The pin 264 has a concentric pintle 268, projecting through adjusting screw 270, threaded into the aperture 266 to adjust the bias of spring 272, which is contacted by one arm 274 of a bellcrank 276, journaled on pin 278 fixed in the brackets. The other arm 280 cooperates with a second spring 282 anchored on the frame 73, so that when the bellcrank 276 is free to move, the bias of the second spring 282 is added to that of the first spring 272 to increase the pressure of the brake to thereby increase the winding tension of the tape 68 for the purpose mentioned before. The arm 280 is controlled by a longitudinally movable control rod 284 to remove the bias of the second spring 282 from the system including the brake at selected times to be described further hereinafter.

In order to make certain that the elements of the taping device 74 are stopped in their right position, the main drive shaft 214 is provided with a notched wheel 290 (FIG. 33), with which cooperates roller 292 mounted on the end of a lever 294, pivoted at its lower end on pivot pin 296 mounted in the frame 73. The lever is biased in a clockwise direction by spring 298 acting against anchor block 300 affixed to the frame, so that the roller 292, when free to move, will enter a notch 290A on the wheel 290. Adjacent a central location, the lever 294 is provided with a second roller 302, cooperating with the end of an actuating arm 304 provided with a cam surface 306 to move the lever 294 counterclockwise against the bias of spring 298 to free the roller 292 from the notch 290A at selected times, particularly when the taping cycle occurs. The arm 304 is affixed to shaft 308 journaled for rotation in a suitable bearing supported in the frame (FIG. 34), to which is also attached a second arm 310 substantially diametrically disposed to the arm 304. The arm 310 is connected to the armature 312 of solenoid 314 by a link 316. A helical spring 318 is provided to bias the assembly for clockwise rotation, (FIG. 34), to cooperate with a stop 320, the spring being anchored on adjustable eye bolt 322. When the taping cycle at the taping head 74 is completed and the driving power is shut off, the roller 292 is engaged in the notch 290A to stop all parts of the machine in a position where a new cycle can be initiated. This is especially necessary at the taping head 74, where the opening in the rotating shuttle 78 must align with the opening in the stationary parts to clear the passageway 80 to allow the already taped coil to be removed and a new untaped coil to be positioned within the taping head. The solenoid 314 is energized and deenergized at suitable times to control the movements of the roller 292 with reference to the wheel 290 by a control device to be described further hereinafter.

Coil Holding and Rotating Device

In order to move the coil C through the taping device 74 at a speed to position the tape 68 evenly on the coil sides, including the corners of the roughly rectangularly-shaped coil, a special holding means 52 is provided which is driven by means which varies the speed of movement of the coil and also moves the coil in a manner with relation to the taping head 74, so that the coil is evenly covered with a double layer of tape, by providing a half overlap between the turns. The mechanism for holding the coil, and also its driving mechanism will now be described.

Figure 36:
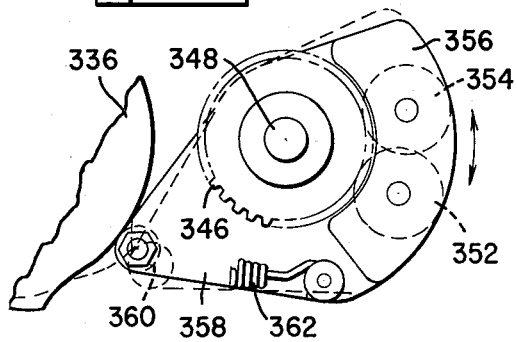
FIGURE 36 is a plan view of the portion of the driving mechanism shown in FIGURE 32.
Figure 35:
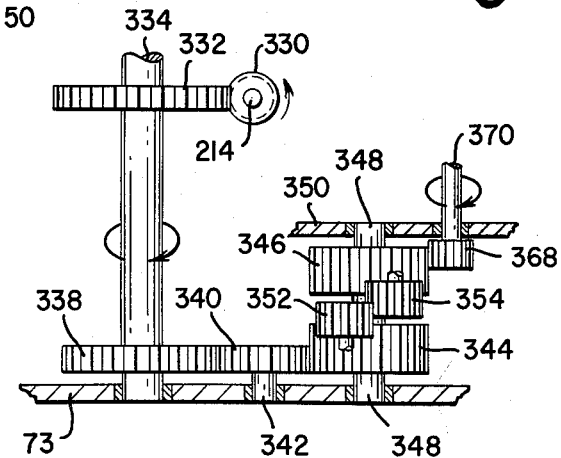
FIGURE 35 is an elevational view of the driving mechanism similar to FIGURE 33.

Referring to FIG. 32, it will be noted that the main driving shaft 214 is provided with a worm 330 which drives a worm gear 332 affixed to vertically-positioned shaft 334, journaled in suitable bearings in the frame 73. Adjacent the lower end of the shaft 334, a contour cam member 336 is provided, below which is mounted a driving gear 338, which drives an idler gear 340 journaled on stud 342 affixed to the frame. The idler gear 340 drives the first of a pair of free gears 344 and 346, which are rotatably mounted in spaced relation on a countershaft 348, affixed to the frame and at its other end in plate 350. Gear 344 is adapted to drive the first of a pair of meshed transfer gears 352 and 354 rotatably mounted in a housing 355 in a driving relation on a movable plate 356 (FIG. 36) which is journaled on countershaft 348, so that the meshed gears 352 and 354 may be moved concentrically about the gears 344 and 346 to add or detract from the speed of transfer of rotation between the gears 344 and 346. The plate 356 has an oppositely-extending portion 358, on which is mounted a cam roller 360 which cooperates with the contour cam 336 (FIG. 33), to control the concentric position to the transfer gears 352 and 354, so that the rise or fall of the cam accelerates or decelerates the rotative speed of gear 346. The roller is, biased against the cam 336 by spring 362, acting between the stud 364 on the plate and its anchor at adjustable eye bolt 366 on the frame. The first transfer gear 352 drives the second transfer gear 354, which, in turn, drives gear 346 (FIG. 35) and the gear 346, in turn, drives gear 368 mounted on a vertical shaft 370 rotatably mounted in plate 350 and extending upwardly to drive the coil-holding and rotating device 52.

The relation between the contour cam 336, the movable plate controlled by the cam with its meshed gears 352 and 354, and the gear train consisting of gears 338, 340, 344, 346 and 368, wherein the gears 352 and 354 form a driving relation between gears 344 and 346, is, in effect, a controllable differential, with the cam 336 being capable of varying the speed of rotation of shaft 370, or even of instantaneous stoppage or reversal of rotation of the shaft, depending upon the contour of the cam relative to the constant speed of rotation of shaft 334. This control of the speed of rotation of shaft 370 is important to control the lapping of the tape 68 on the coil C as the tape 68 is being applied at the taping device 74.

On the upper end of shaft 334, a control cam 372 is mounted, which controls the actuation and timing of various devices of the machine, which will be described further hereinafter.

By referring to FIGS. 20 and 18, it will be seen that the upper end of vertical shaft 370 is provided with an enlargement 370A which is journaled in aperture 372 in a fixed plate 374 fastened to the frame in any suitable manner. The enlargement 370A has cut into it pinion 376 which will also pass through the aperture 372 for convenient assembly of the parts, so that it may project above the plate 374 into a box-like chamber 378 formed by side and end members 380 and 382 and cover 384, which are held together in any convenient manner as by screws. In the chamber 378 a sliding member 386 is mounted comprising a plate having an oval recess 388 cut in its lower side, on the bottom of which is mounted by means of screws, an elongated torus member 390, the outer side of which is provided with gear teeth to mesh with the pinion 376, as seen in FIG. 18. The wall of the oval recess 388 and the geared outer side of the torus member 390 are in substantially parallel relation to allow the pinion 376 to drive the assembly. To guide the sliding member 386 when driven by the pinion 376, a central stud 392 is provided which cooperates with the central elongated aperture 394 of the torus member 390, and also a pair of depending lugs 396 and 398 on the sliding member 386 are provided positioned along the major axis of the elongated aperture 394, to fit into a guideway 400 cut into the upper surface of the plate 374, consisting of two circular arcs 400A and 400B and a pair of aligned straight portions 400C and 400D. The arcs 400A and 400B are concentric with the stud 392 while the center line of the straight portions 400C and 400D also pass through the center of the stud 392. This construction allows the pinion 376 to drive the sliding member 386 with counterclockwise circular motion with the stud 396 in the guideway portion 400B, then with a straight line motion with the studs 396 and 398 in the straight portions 400C and 400D of the guideway, which causes the central stud 392 to shift to the opposite end of the aperture 394, and then again with a circular motion with the stud 398 in the guideway portion 400B and finally with a straight line motion again with the stud positions reversed, thus completing a cycle.

Figure 12:
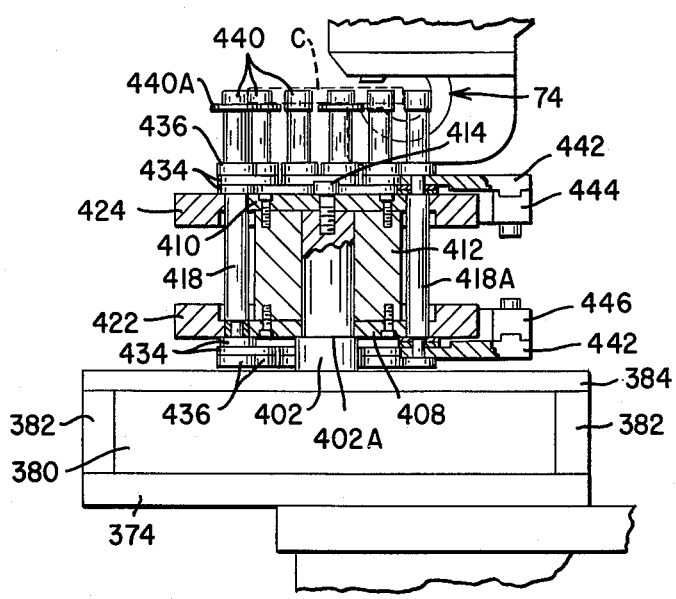
FIGURE 12 is an elevational view taken along the line 12—12 of FIGURE 13.
Figure 17:
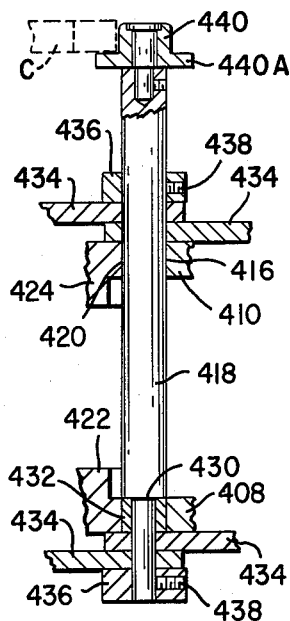
FIGURE 17 is an elevational view partly in section showing one of the vertical spindles on the coil holding mechanism.
Figure 15:
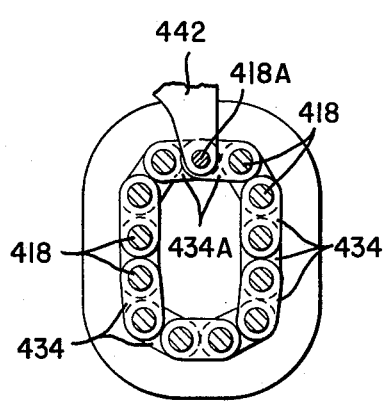
FIGURE 15 is a plan view similar to FIGURE 13.
Figure 16:
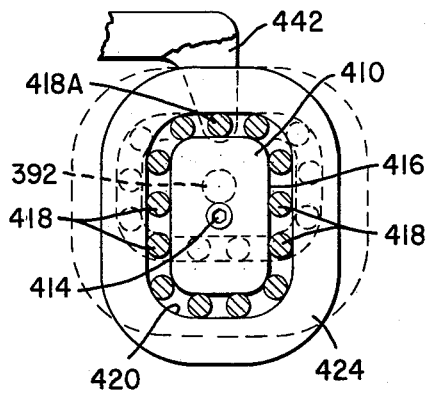
FIGURE 16 is a plan view partly in section of the coil holding mechanism.

On the upper side of the sliding member 386 a headed member 402 (FIGS. 19 and 20) is seated in a recess 404, so that its post may project upwardly through a clearance aperture 406. The post 402 is, therefore, moved along the same locus as that of the sliding member 386 described previously. Referring to FIGS. 12 and 16, it will be noted that the post 402 is fitted with a pair of horizontally-positioned plates 408 and 410, separated by a spacer block 412. The first plate 408 is fitted against a shoulder 402A of the post 402, while the second plate 410 is abutted against the end of the post, being held in position by a bolt 414. The spacer block 412 is bolted to both plates as shown. The peripheral contour 416 of plates 408 and 410 is the same as shown in plan view in FIG. 16, being approximately the same as the outer contour of the coil C, shown in FIG. 1A, which is to have tape applied to it by the machine. The contoured edge 416 of the plates forms one wall of a track in which vertical spindles 418 are adapted to move, the other wall of the track being formed by the inner contoured edge 420 of a pair of apertured plates 422 and 424 which are held in spaced relation by vertical plates 426 and 428 (FIGS. 13 and 14) which are attached thereto in any convenient manner as by bolting. The assembly of the plates 422 and 424 float about with the juxtaposed plates 408 and 410 which are moved by the driven post 402, with the spindles 418 positioned between them in a spaced relation as shown in FIG. 16. At the lower end of the spindles 418, a shoulder 430 is provided on each to seat a bearing sleeve 432 as shown in FIG. 17. The adjacent spindles 418 are held in equally spaced relation by superposed links 434 which engage adjacent spindles (FIG. 15), both below plate 422 and above plate 424 (FIG. 12), being held in position by lock collars 436 which are affixed to the spindles by set screws 438. The assembly of plates 422 and 424 rests upon the upper set of links at the lower end of the spindles 418 as the assembly moves around the spindles in the central track between the surfaces 416 and 420 as best seen in FIG. 17.

All of the spindles 418, except the central spindle 418A at the rear of the assembly (top of FIG. 15) extend upwardly a substantial distance into the plane of the opening 80 (FIG. 6) of the taping head 74 (FIG. 12), where each spindle is provided with a roller 440, alternate ones being provided with an annular flange 440A at their lower ends on which the coil C is adapted to lay, except those rollers adjacent the taping head 74 which would cause interference with the movement of the parts with the head. The spindle 418A engages a yoke 442 at both of its ends which also have superposed links 434A. The yoke has two arms 444 and 446 separated by a spacer block 448 (FIG. 14) at a laterally displaced fixed pivot point 450. The yoke 442 holds the spindle 418A substantially stationary except for a small movement thereof to give some flexibility to the whole assembly to compensate for changes in shape and for tolerances in the various parts. The links 434 and the spindles 418, therefore, accommodate themselves to the changes in position of the track in which the spindles move, as the members 408, 410, and 422 and 424 move through their orbit relative to the taping head 74 so as to move the coil through the taping head at varying speeds whereby the tape 68 is applied in an even double layer to the coil.

Figure 37:
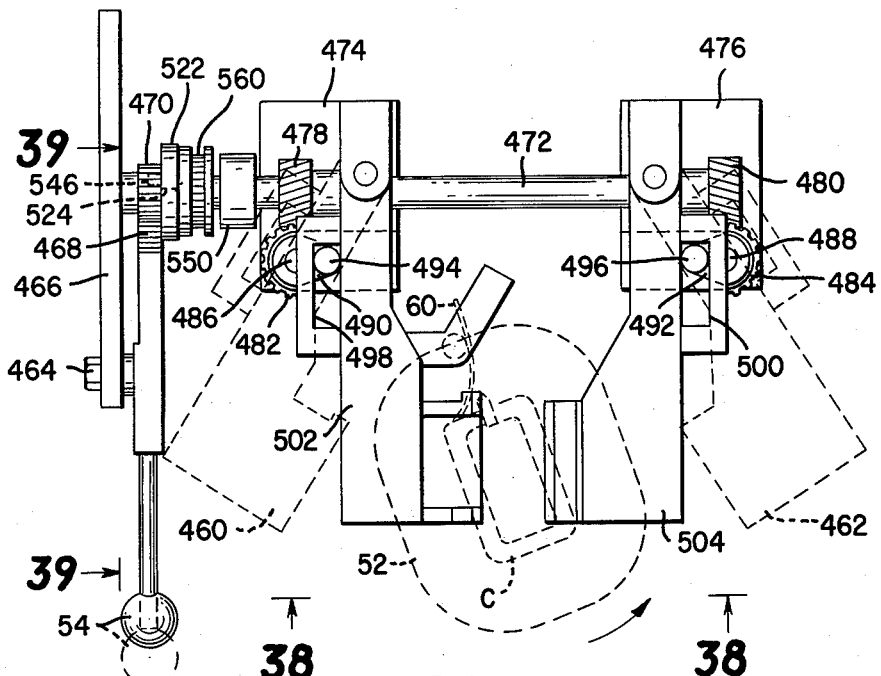
FIGURE 37 is a plan view of a portion of the mechanism cooperating with the coil holding device shown in FIGURE 12.
Figure 38:
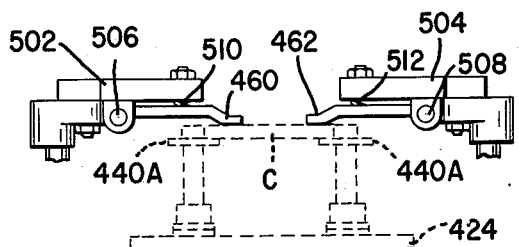
FIGURE 38 is an elevational view taken along the line 38—38 of FIGURE 37.
Figure 39:
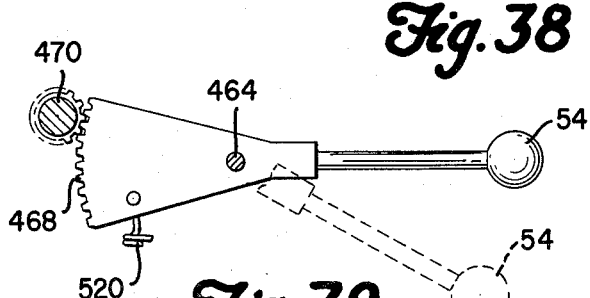
FIGURE 39 is an elevational view taken along the line 39—39 of FIGURE 37.

In FIG. 64, the coil C is shown in position between the rollers 440 by resting on the flanges 440A relative to the taping head 74. In order to start the taping operation behind the projecting inner lead 64 of the coil C, the coil is inclined at an angle approximately 27° displaced from the axis of the taping head as shown in the drawing. The coil is placed in this position by the operator when the machine is stationary with the outer lead 60 of the coil projecting outwardly free of the taping head, but as the coil is being rotated counterclockwise throught the taping head, this outer lead will be bent into parallel relation with the main body of the coil as it passes the adjacent rollers in the holding means 52 already described. In being bent in this manner it lays over a part of the coil to which tape has already been applied. The operator closes the machine by actuating handle 54, which brings into the taping head the free end of the tape 68, as already described, and also moves a pair of plates 460 and 462 (FIG. 37) over the coil to resiliently hold the coil on the flanges 440A as is best seen in FIG. 38. These mechanisms will now be described.

The handle member 54 is provided with a pivot 464 adjacent a central location which is fixed in a portion 466 of the frame. The opposite end of the handle assembly is provided with a sector gear 468 which rotates a pinion 470 attached to the end of a transverse shaft 472 positioned behind the coil holding means 52 (FIG. 37), the shaft being journaled in bearings in blocks 474 and 476 affixed to the frame. Immediately above the blocks 474 and 476 the shaft 472 is provided with a pair of worms 478 and 480, which drive cooperating worm gears 482 and 484 journaled on bearing pins 486 and 488 affixed in the upper side of the blocks 474 and 476.

The gears 482 and 484 are each provided with an arm 490 and 492, on each of which is affixed an eccentric pin 494 and 496 to fit into cooperating guideways 498 and 500 forming a part of pivoted arms 502 and 504 to which the plates 460 and 462 are attached by pivot pins 506 and 508 (FIG. 38). Springs 510 and 512, acting between an overhanging part of the pivoted arms 502 and 504 and the plates 460 and 462, bias the plates downwardly to resiliently hold the coil C against the flanges 440A when in a cooperative position therewith as shown in FIG. 38. By this mechanism, plates 460 and 462 and their supporting pivoted arms 502 and 504 may be moved into and out of cooperative relation by the movement of the handle 54. The pins 494 and 496 move along the guideways 498 and 500 during the movement of the parts.

The handle 54 is biased to open position by spring 520 which has its fixed end attached to a frame portion as shown in FIG. 2. In order to hold the parts actuated by the handle in closed position, a latch is provided, the parts of which are shown in open position in FIG. 51. The pinion 470, as actuated by the sector gear 468, moves at an angle slightly over 180° from open to closed position and a little beyond as may be seen by comparing FIGS. 51, 53, and 54. The pinion is flanked by a circular plate 522 whose periphery is cut away to form latch notch 524, which cooperates with a spring-biased pawl 526 to hold the parts in closed position as shown in FIG. 53. The pawl cooperates with a spring-urged release bar 528 whose notch 530 contacts the upper side of the pawl to release it from the notch 524 when the release is moved downwardly by the downwardly movement of lever 532 affixed to a shaft 534. The lever and the release bar 528 are pivotally connected by pin 536. The second arm of the lever 532A, also attached to the shaft 534, is biased in a counterclockwise direction about pivot 534 by spring 538, so that its opposite end contacts stop 540. The lever is moved in a counterclockwise direction by a cam-head stud 542 contacting a roller 544 pivoted on the arm 532A when the stud is rotated under the roller by rotatable plate 372 (FIG. 33) already described as being attached to the upper end of vertical shaft 334 to be further described hereinafter. The release 528 is moved counterclockwise against its spring bias by a button 546 on the side face of the plate 522, when the button contacts the cam face 528A of the release, which allows the pawl 526 to move upwardly to engage the notch 524 to lock the parts of the machine in closed position as shown in FIG. 53.

Also positioned on the shaft 472 is a switch actuator arm 550, which contacts switch roller 552 (FIG. 54) to actuate switch 554. This forms a safety feature for the machine, as the operator must urge the handle 54 downwardly a small amount over that required to engage the pawl 526 with the notch 524 to actuate the switch 554 (FIG. 54) and, at the same time using the other hand on the opposite side of the machine, must contact switch button 56, to start the machine, so that no injury can be suffered by the operator.

Figure 40:
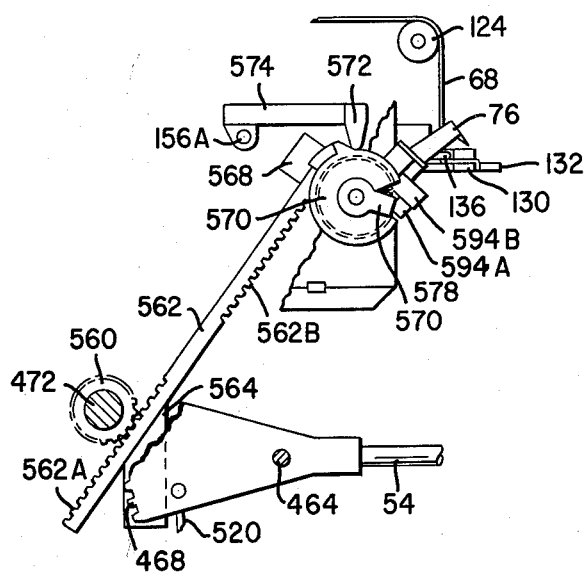
FIGURE 40 is an elevational view of the manual driving means for the mechanism cooperating with the free end of the tape.
Figure 41:
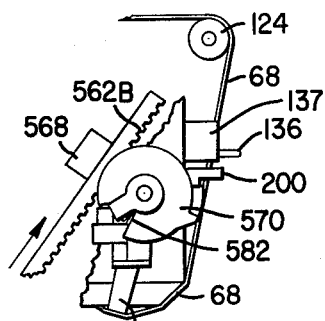
FIGURE 41 is a view of a portion of the machine shown in FIGURE 40 in a position where the free end of the tape is placed in cooperative relation with the winding element.
Figure 42:
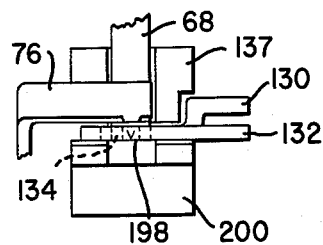
FIGURE 42 is an elevational view of the mechanism cooperating with the free end of the tape taken along the line 42—42 of FIGURE 43.
Figure 43:
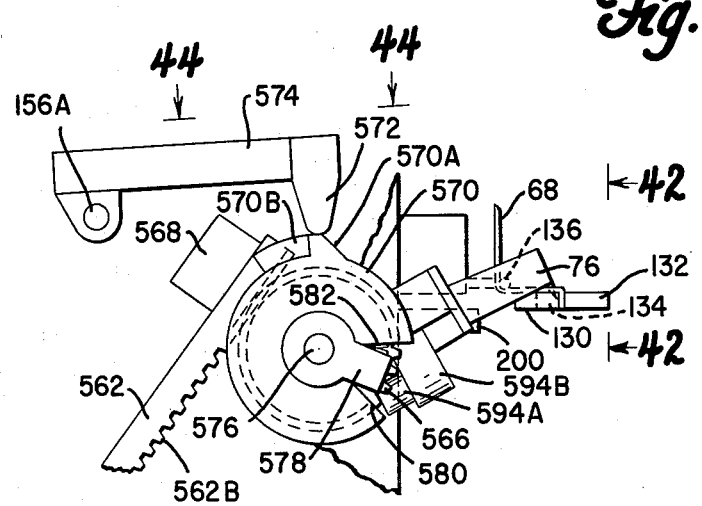
FIGURE 43 is an elevational view of the mechanism which cooperates with the free end of the tape shown in piercing position.

The shaft 472 is also provided with a gear 560 (FIG. 37) positioned between the switch actuator arm 550 and the plate 522 which cooperates with a rack bar 562 (FIG. 40) extending obliquely upwardly to actuate the tape threading device 76 already described hereinbefore. The lower toothed surface 562A of the rack bar 562 is held against the gear 560 by a buttress 564, along which the smooth opposite side of the rack bar slides. On the upper end of the rack bar, the teeth 562B are located on the opposite side of the bar, where they actuate a second gear 566 (FIG. 2 and 43) which drives the tape-threading device. A second buttress 568 is provided at this point to hold the parts in engagement by cooperating with the smooth back side of the rack bar (FIGS. 40, 41 and 43). Mounted on the forward side (FIG. 43) of the gear 566, and preferably integral therewith, a cam disc 570 is provided, which, when rotated clockwise, actuates a cam rider 572 affixed by a spring arm 574 to the end of shaft 156A, which has already been referred to in connection with FIGS. 25, 26, and 27. The cam rider, when it rides up the cam face 570A, rotates the shaft 156A in a counter-clockwise direction to disengage the latch 156 from the notch 160 in the member 130 (FIG. 31) as already described. Both the gear 566 and the cam disc 570 are rotatably mounted on the end of shaft 576 which is suitably journaled in a horizontal position in adjacent portions of the frame. A resilient driving connection is provided between the shaft 576 and the gear 566 by a dog 578 affixed to the end of the shaft 576 and extending into a slot 580 in the cam disc 570, where a spring 582 is positioned on one side of the dog to give a resilient connection when the cam disc is rotated by the gear 566 in a clockwise direction.

Figure 3:
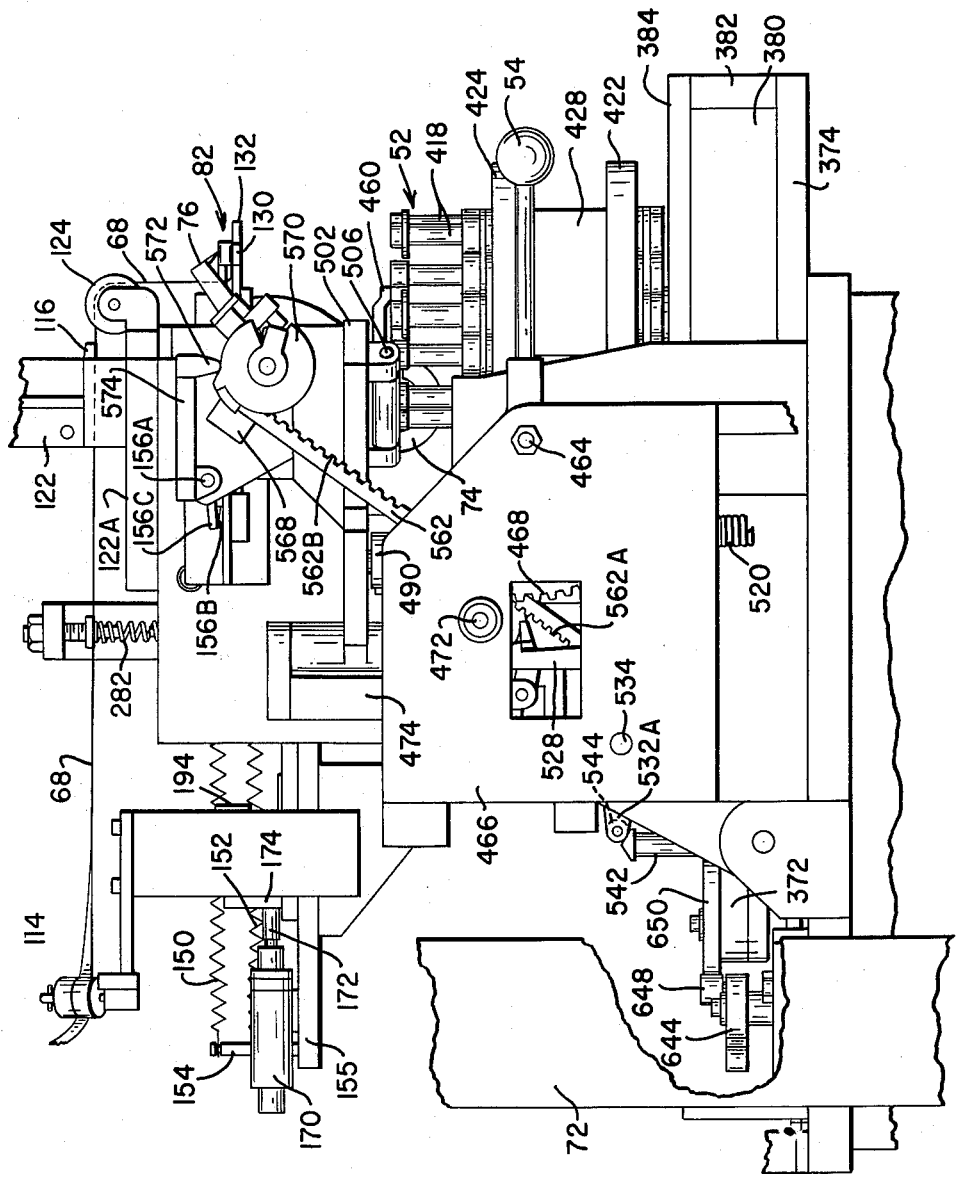
FIGURE 3 is a side elevational view of the machine taken opposite from the view shown in FIGURE 1.
Figure 4:
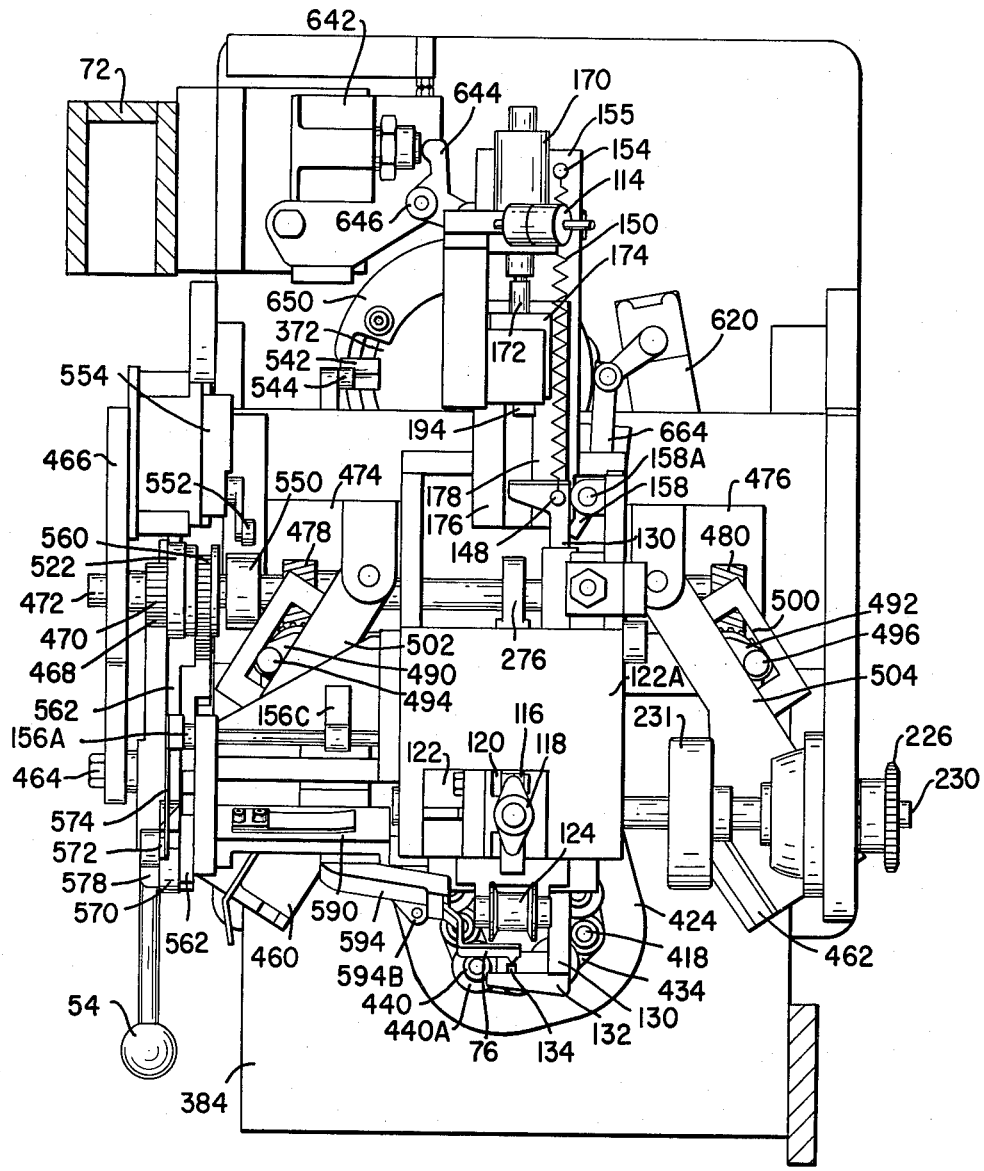
FIGURE 4 is a plan view of the machine partly in section.
Figure 5:
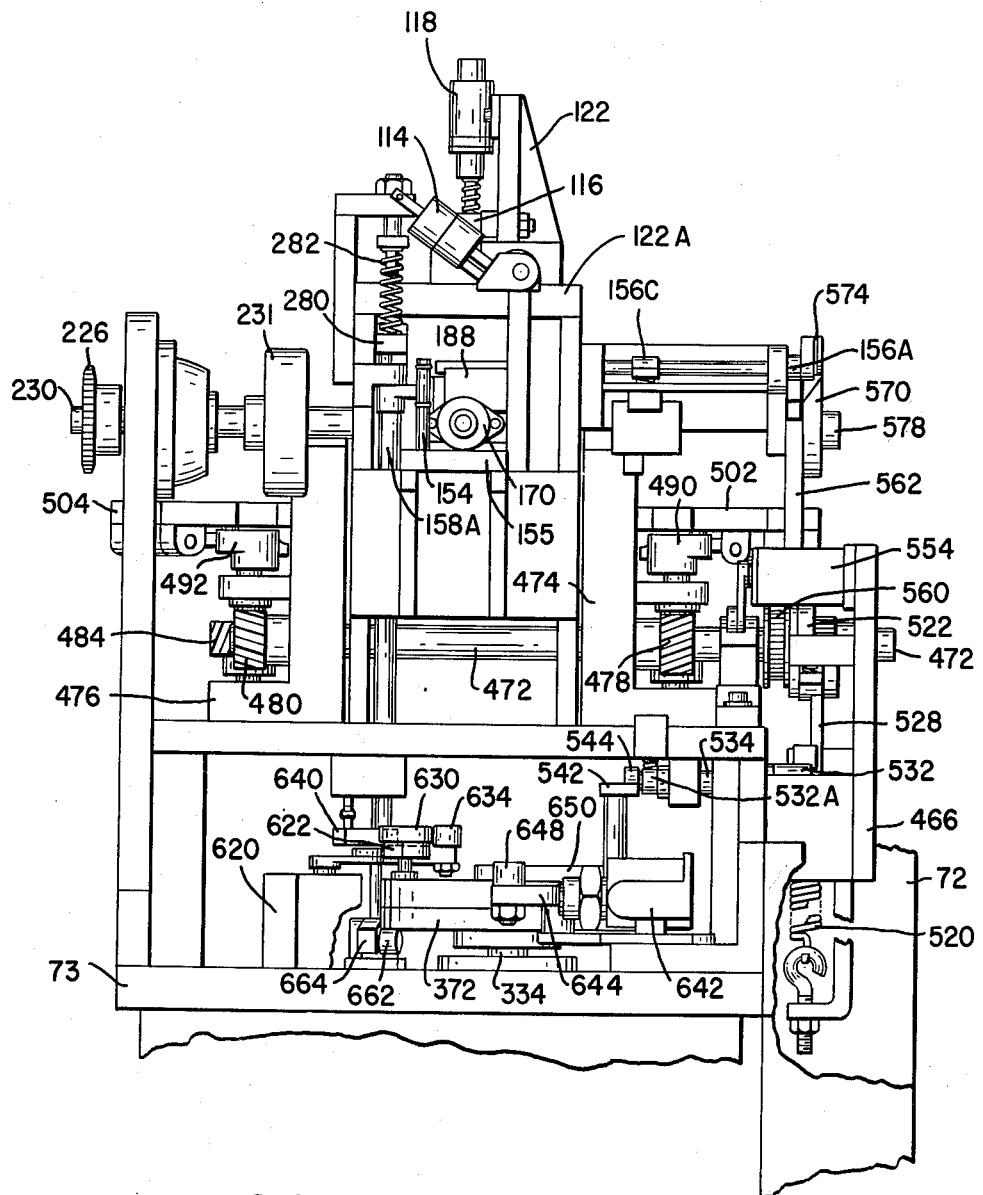
FIGURE 5 is a rear elevational view of the machine.
Figure 44:
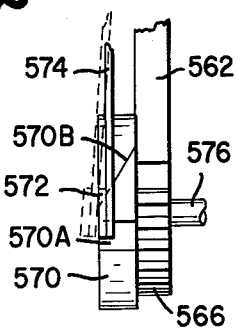
FIGURE 44 is a plan view of a clutch mechanism incorporated in the device shown in FIGURE 43 taken along the line 44—44.

Returning to the cam disc 570, when the cam rider 572 has been actuated by the cam face 570A on the forward face of the cam rise and falls behind the cam rise during clockwise rotation, it will not be actuated again, since the shaft 576 rotates only through an angle of approximately 120°, and only on its return stroke (counterclockwise rotation) will the rider contact the back side of the cam rise. The back side 570B is a transverse cam surface which will not raise the cam rider 572 but only deflect it outwardly against the resilient bias of the arm 574 to bypass the cam rise laterally without actuating the shaft 156A until the mechanism is ready for a second cycle where the rider will again contact cam surface 570A on the forward side. This is clearly shown in FIG. 44. Referring to FIG. 3, the shaft 156A with its arm 574, is biased to rotate in clockwise direction by resilient means 156B acting through arm 156C affixed to the shaft (FIG. 4).

Figure 45:
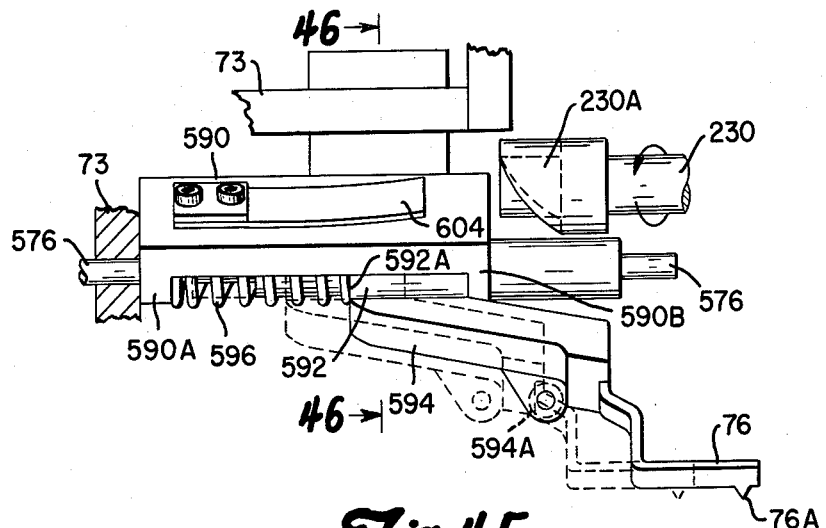
FIGURE 45 is a plan view of a portion of the mechanism shown in FIGURE 43.
Figure 46:
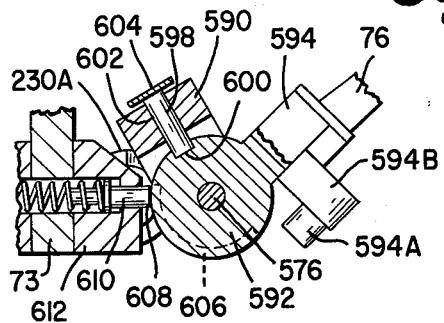
FIGURE 46 is an elevational view in section taken along the line 46—46 of FIGURE 45.
Figure 48:
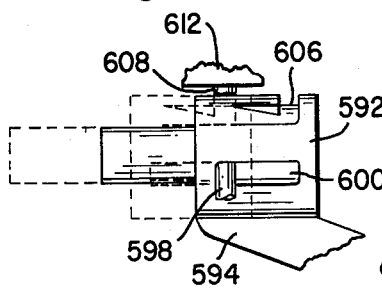
FIGURE 48 is an elevational view taken along the line 48—48 of FIGURE 47.

Referring to FIG. 45, the horizontal shaft 576 beyond its journal in the frame member is provided with an affixed bracket 590, the parallel portion of which closely overrides a collar member 592 which has an integral lateral projection 594 to which is attached the tape threading member 76 already described. The collar member 592 is rotatably mounted on shaft 576 and is slidable longitudinally thereof against the bias of spring 596, which acts between a shoulder 592A on the collar and one end 590A of the bracket 590 to urge the collar to the opposite end 590B thereof. The bracket 590 and the collar 592 are splined together by a radially-extending pin 598 adapted to engage at its inner end with longitudinal slot 600 in the collar (FIG. 48) and slidably mounted in a bore 602 in the bracket to engage, at its opposite end, a leaf spring 604 affixed on the outer side of the bracket to bias the pin into the slot 600. The collar 592 is provided with a second slot 606 on its outer surface which cooperates with a second spring-biased pin 608 slidably mounted in bore 610 in a fixed portion 612 attached to the frame 73 (FIG. 46). Referring to FIGS. 48 and 48A, the relation of slots 600 and 606 is made clear. Slot 600 is a longitudinal slot of uniform depth, while slot 606 is of L-shaped conformation, one arm 606A being of uniform depth while the other arm 606B gradually converges with the outer surface of the collar 592 which allows disengagement of the pin 608 with the cooperating slot.

The parts just described are all adapted to be actuated by the manual manipulation of the handle 54 by the operator of the machine. With the parts in the open position shown in FIG. 40, it will be observed that the tape-threading device 76 is in its uppermost position immediately above the slot 134 in the member 130, which is resiliently held against the member 132 to lock the free end of the tape 68 between them. This position is shown in FIGS. 2 and 22. With a coil C then positioned in the holder 52, the operator moves handle 54 downwardly against the bias of spring 520, until the releasable latch pawl 526 engages the notch 524 (FIGS. 51–54). This will position the plates 460 and 462 over the upper side of the coil (FIG. 37). It will also cause the tape-threading device 76 to engage the free end of the tape 68 by piercing it with the point 76A while it is still being held between sliding members 130 and 132 doing so at the slot 134. At substantially the same instant latch 156 will be disengaged by cam surface 570A which allows the sliding member 130 to retract by action of resilient means 150 freeing the end of the tape, which has, however, become impaled on the member 76. The bracket member 590 then carries the collar 592 and the tape-threading member through an angle of about 120° to the position shown in FIG. 41, where the free end of the tape is carried into the taping head 74. Pin 598 is engaged with the left end of slot 600 (FIG. 48), while pin 608 is riding freely on the periphery of the collar 592.

Figure 47:
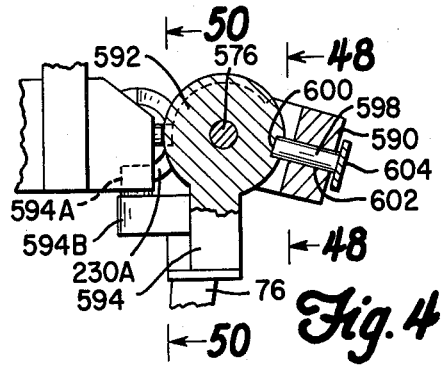
FIGURE 47 is an elevational view partly in section of the device shown in FIGURE 46 in another operative position.
Figures 49, 50:
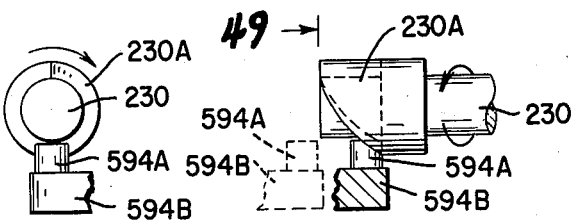
FIGURE 49 is an elevational view of the control mechanism shown in FIGURE 50 taken along the line 49—49.
FIGURE 50 is an elevational view partly in section of a control mechanism taken along the line 50—50 of FIGURE 47.

The rotation of the collar 592 from the open position shown in FIG. 46 to the closed position shown in FIG. 47, also advances a stud 594A mounted on an extension 594B of the projection 594 into the locus of a face cam member 230A mounted on the end of shaft 230, which drives the taping head 74 already described (FIG. 6). When the machine is started by the operator, the shaft 230 immediately begins to rotate, so that during its first revolution the face cam 230A will move the stud 594A and the whole assembly of the tape-threading member 76, the projection 594, and the collar 592 to the left (FIG. 50) against the bias of spring 596. This causes the pin 598 to move to the opposite end of the slot 600, and the pin 608 to engage the far end of the slot 606 (shown in phantom in FIG. 48A), which holds the assembly in displaced position. This causes the free end of the tape to also be displaced laterally from the center of the coil taping machine as shown in FIGS. 55, 56 and 57. FIG. 55 shows the position of the parts before wrapping of the tape starts; FIG. 56 the position of the parts at the end of the first revolution; and FIG. 57, the position of the parts after a few turns of tape have been wound which has torn the tape from the impaling tip 76A of the tape-threading device. The winding then continues around the coil.

The return to normal position shown in FIG. 40 occurs when the handle 54 is tripped by the control mechanism as described with relation to FIGS. 51 to 54. The control mechanism for reaching this end will now be described.

Control Mechanism for Taping Cycle

Figure 33:
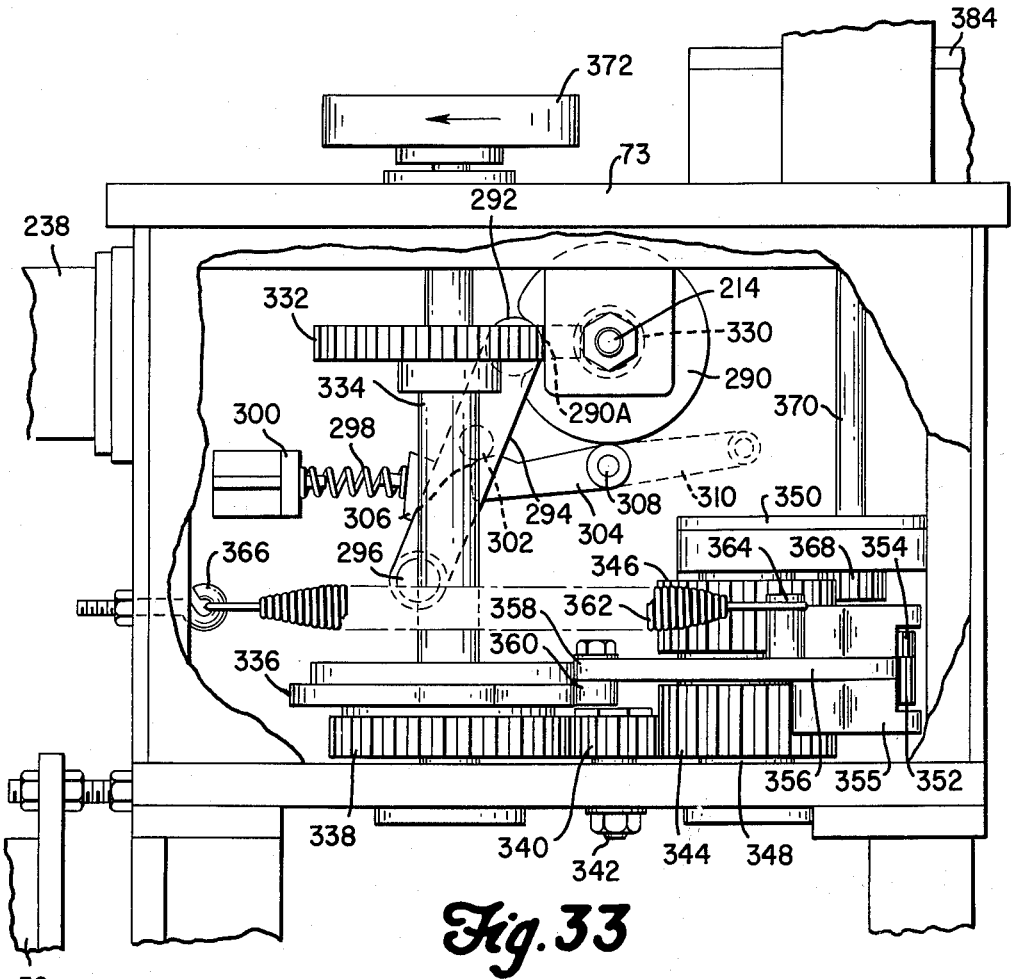
FIGURE 33 is an elevational view of the device shown in FIGURE 32.

Referring to FIGS. 33 and 58, the control disc 372, already described in general, is mounted on the upper end of vertical shaft 334, and rotates one revolution for each taping cycle of the machine wherein the tape 68 is wound on coil C. The end of the taping cycle is controlled by a switch 620 which opens the power circuit to the motor 50, when actuated by control cam 622, mounted on the upper side of the disc 372 by a stud 624 (FIGS. 58, 59 and 63). The beginning of the taping cycle is controlled by switch 554, actuated by the member 550, controlled by handle 54 and held closed by the left hand of the operator holding down the handle 54, while, at the same time, the right hand of the operator pushes button 56 (FIGS. 1 and 54). This overcontrols switch 620 and starts the taping cycle, which continues until terminated by the next actuation of switch 620 after a complete revolution of disc 372.

With the beginning of the taping cycle, the free end of the tape having been carried into the taping head 74 by the tape-threading device 76, the tape will be applied to the coil C, as shown in FIGS. 7 and 57, which pulls the tape 68 into the machine from the bight already formed in the unreeling device 72 (FIG. 1) until substantially all the tape stored in the bight in the tape will be pulled into the machine. At this time, a half cylinder cam 630, also mounted on the upper side of disc 372 by a stud 632, will contact roller 634 mounted on a lever 636 affixed to the rod 158A (FIG. 60) which releases latch 158 (FIGS. 25, 26, and 27) against the bias of spring 638 acting on the end of an arm 640 (FIGS. 58 and 60) which allows spring 152 (FIG. 28) to retract slidable member 132, which cuts the tape, as shown in FIG. 23, and, at the same time, grips the free end in cooperation with sliding member 130 preparatory for the next winding cycle.

In this phase of the taping cycle, a control valve 642 for the fluid pressure has been held in a first position by being actuated against a spring bias by a bellcrank 644 pivoted on pin 646, the one arm of which is provided with a roller 648 contact cam shoe 650, mounted on the periphery of cam disc 372 (FIG. 58). The valve 642 in its first position, as shown in FIG. 58, places fluid pressure on the lower side of the piston in cylinder 110 (FIG. 1) to maintain the roller 106 in "up" position as shown in FIG. 21. At the front end 650A of the cam shoe 650, fluid pressure is also momentarily applied by the valve 642 to single-acting air cylinder 170, which pushes sliding elements 130 and 132 forwardly until latches 156 and 158 are again engaged and returned to normal position. This places the tape 68 in forward position preparatory for the new cycle as shown in FIG. 24.

When the roller 648 drops off the back end 650B of the cam shoe, the control valve 642 moves to a second position, which places fluid pressure on the top side of the piston in cylinder 110 which moves the roller 106 downwardly to form the storage bight in the tape 68 as shown in phantom in FIG. 21. At the same instant, fluid pressure is applied by the valve 642 to the cylinder 118 which locks the tape 68 by actuating the brake shoe 116, which holds the tape against the pull of the roller 106 during the formation of the storage bight.

As the cam disc 372 continues to rotate and the winding cycle approaches the end, an indentation 660 on the lower face of the disc cooperates with a roller 662 (FIG. 63) mounted on the end of lever 664 pivoted on a fixed pin 666, which allows the rod 284 to drop down by the bias of spring 282 (FIG. 6) which adds additional pressure for a short period of time to the brake shoe 260, contacting the last remaining turn of tape 68 stored on the shuttle 78. This increases the tension in the tape 68 being wound on the coil C, so that the sharpened tip 64A of the terminal 64 may pierce the tape as already described. The cam-headed stud 542 then contacts the roller 544 to trip the latch pawl 526, allowing the spring 520 to pull the handle 54 to original position preparatory to beginning a new cycle. In FIG. 48A this tripping causes the pin 608 to slide along the slot 606 to the opposite end where the slot 606B tapers out to the upper surface of the collar 592, which is followed by the pin 608 under the bias of spring 596 (FIG. 45). This places the tape-threading member back over the slot 134 preparatory to piercing the new end of the tape 68. The roller 648 then rides up the front end 650A of the cam shoe 650 (FIG. 58) to again raise the roller 106 to the "up" position (FIG. 21). The switch 620 is then actuated by the cam 622 to stop the machine, the cycle having been completed. The taped coil C is then removed from the open machine by the operator, a new untaped coil inserted, and the operator initiates a new cycle as already described.

I claim:
1. In combination with a machine having a head for wrapping tape about toroidal members of a flexible holding means to engage the perimeter of a toroidal member at spaced positions, said flexible holding means being fixed at a point adjacent the head, means to cause the flexible holding means to rotate the toroidal member to present the sides of the toroidal member to the head to wrap tape thereon, and means to guide the flexible holding means with reference to the fixed point in a manner to cause the flexible holding means to conform to the perimeter of the member.

2. In a holding means to a relatively rigid member having a perimeter, non-circular in conformation, a flexible member fixed at one point having means contacting the perimeter of the relatively rigid member at spaced points, means to move and to control the flexible member in a manner to move the rigid member so that all parts of its perimeter are moved past a fixed point.

3. In combination with a machine having a rotating head for wrapping tape about toroidal members, a flexible chain-like holding means including spaced rollers to engage the perimeter of the toroidal members at spaced positions, said flexible holding means having a portion fixed at a point adjacent the head, means to cause the flexible holding means to rotate the member to present the sides of the member to the head in a predetermined relation thereto to wrap tape thereon, and means to guide the flexible holding means with reference to the fixed portion in a manner to cause the flexible holding means to conform to the perimeter of the member.

4. In combination with a machine having a head for wrapping tape about toroidal members, a flexible holding means including rollers to engage the perimeter of a toroidal member at spaced positions, said flexible holding means having a fixed portion at a point adjacent the head, means to cause the flexible holding means to rotate and move the toroidal member to present the sides of the toroidal member to the head to wrap tape thereon, and means to guide the flexible holding means with reference to the fixed portion in a manner to cause the flexible holding means to conform to the perimeter of the member.

5. In a holding means for moving a relatively rigid member having a perimetrical portion, non-circular in conformation, a flexible member fixed at one point having means contacting the perimetrical portion of the relatively rigid member at spaced points, means to control the flexible member in a manner to move the rigid member so that all or selected parts of its perimetrical portion are moved past a fixed point.

6. In a holding and moving means for a relatively rigid member having a perimeter, non-circular in conformation, a flexible member fixed at one point having portions contacting parts of the relatively rigid member at spaced points, means to control the flexible member in a manner to move the rigid member at controlled speeds so that all or selected parts of its perimeter are moved at predetermined speeds past a fixed point.

7. In combination with a machine having a rotating head for wrapping tape about toroidal members, a flexible holding means to engage the perimeter of a toroidal member at spaced positions, said flexible holding means being fixed at a point adjacent the rotating head, manually-controlled means to hold the toroidal member in the flexible holding means, means to cause the flexible holding means to rotate the toroidal member at controlled speeds to present the sides of the toroidal member to the rotating head to wrap tape thereon, and means to guide the flexible holding means about the fixed point in a manner to cause the flexible holding means to conform to the perimeter of the toroidal member.

8. In combination with a machine having a rotating head for wrapping insulating tape about a toroidal member, a flexible chain-like holding means to engage the perimeter of the toroidal member at spaced positions, said flexible holding means having a fixed point adjacent the rotating head, manually-controlled means to hold the toroidal member in the flexible holding means during the wrapping operation, means to cause the flexible holding means to rotate the toroidal member through the rotating head so as to pass all of the sides of the toroidal member through the rotating head for the application of tape thereon, means cooperating with the rotating head to cut the tape to a predetermined length, and means to guide the flexible holding means relative to the fixed point in a manner to cause the flexible holding means at all times to conform to the perimeter of the toroidal member.

9. In combination with a machine having a rotating head for wrapping tape around a toroidal member, a holding means including rollers to engage a toroidal member at spaced points, said holding means having a fixed point adjacent to the rotating head, manually-controlled means to hold the toroidal member in the holding means during the period of movement of the toroidal member through the rotating head for the application of tape thereon, automatic means to insert the end of a continuous winding tape into the rotating head, means to cause the holding means to move the toroidal member through the rotating head, so that the head may wrap tape to substantially all portions thereof, means to cut the continuous tape issuing from a source of supply to a predetermined length, and means to guide the holding means with reference to the toroidal member to cause the holding means to conform to the perimeter of the toroidal member at all times during the wrapping operation.

10. In a machine for insulating coils having a rotating head for wrapping insulating tape about a non-circular toroidal coil member, a flexible chain-like holding means including rollers to engage the perimeter of the toroidal coil member at spaced positions, said flexible holding means having a fixed point adjacent the rotating head, manually-controlled means to hold the toroidal coil member in the flexible holding means during the wrapping operation, means to cause the flexible holding means to rotate the toroidal coil member at varying controlled speeds through the rotating head so as to pass all of the sides of the toroidal coil member through the rotating head for the application of tape thereon in a uniformly lapped relation, means to cut the tape to a predetermined length, and means to guide the flexible holding means relative to the fixed point in a manner to cause the flexible holding means at all times to conform to the perimeter of the toroidal coil member.

11. In a machine for insulating coils having a rotating head for wrapping insulating tape about a non-circular toroidal coil member, a flexible holding means including cooperating links and rollers to engage the perimeter of the coil member at spaced points, said flexible holding means having a relatively fixed point adjacent the rotating head, manually-controlled means to hold the coil member in the holding means during the period in which the insulatnig tape is wrapped upon it, said manually-controlled means including a movable portion engaging the free end of the insulating tape for positioning the tape end in cooperative relation with the rotating head, means to cause the flexible holding means to rotate the coil member at varying controlled speeds through the rotating head so as to pass all of the sides of the coil member through the rotating head for application of tape thereon in substantially uniform overlapping layers, means to cut the tape to a predetermined length, means to disengage the means engaging the free end of the tape, and means to guide the flexible holding means relative to the fixed point in a manner to cause the flexible holding means at all times to conform to the perimeter of the coil member.

12. In a machine for insulating coils having a rotating head for wrapping insulating tape about a non-circular toroidal coil member, a source of supply for the tape, a flexible holding means including links and rollers to engage the perimeter of the coil member at spaced points, said flexible holding means being adapted to move in a manner to cause the sides of the coil member to move through the rotating head, manually-controlled means to hold the coil member in horizontal position in the holding means during the period in which the insulating tape is wrapped thereon, means to move the flexible holding means to rotate the coil member so as to pass all the sides of the coil member through the rotating head in varying controlled timed relation so that the insulating tape is applied thereon in substantially uniform overlapping layers, means to cut the tape to a predetermined length, and means to guide the flexible holding means whereby the flexible holding means conforms at all times to the perimeter of the coil member.

13. In a machine for insulating coils having a rotating head for wrapping insulating tape about a non-circular toroidal coil member, a flexible holding means including cooperating links and rollers to engage the perimeter of the toroidal coil member at spaced points to hold the toroidal coil in a horizontal position in a fixed plane, said flexible holding means having a relatively fixed point in said fixed plane adjacent the rotating head, manually-controlled means to hold the toroidal coil member in the flexible holding means during the period in which the insulating tape is wrapped upon it, said manually-controlled means including a movable portion engaging the free end of the insulating tape for positioning the tape in a cooperative relation with the rotating head, means to move the flexible holding means to rotate the toroidal coil member in the fixed plane through the rotating head at varying controlled speeds so as to pass all of the sides of the toroidal coil member through the rotating head for application of tape thereon in uniform overlapping layers, means to cut the tape to a predetermined length, means to disengage the movable portion of the manually-controlled means engaging the free end of the tape during the winding cycle, and means to guide the flexible holding means relative to its fixed point in a manner to cause the flexible holding means at all times to conform to the perimeter of the toroidal coil member.

14. In a machine for insulating coils having a rotating head for wrapping insulating tape about a non-circular toroidal coil member, a source of supply for the tape, a flexible holding means including links and rollers to engage the perimeter of the toroidal coil member at spaced points to hold and move the coil member in a fixed horizontal plane, said flexible holding means being adapted to move in a manner to cause the toroidal coil member to move through the rotating head, manually-controlled means to hold the coil member in position in the flexible holding means during the period in which the insulating tape is wrapped thereon by the rotating head, means to move the flexible holding means to rotate the coil member in said fixed horizontal plane so as to pass all the sides of the coil member through the rotating head in a varying timed relation so that the insulating tape is applied thereon in substantially uniform overlapping layers, means to cut the tape to a predetermined length, and means to guide the flexible holding means in a manner to cause the flexible holding means to conform at all times to the perimeter of the toroidal coil member.

References Cited in the file of this patent

UNITED STATES PATENTS

| | | |
|---|---|---|
| 1,946,717 | Snyder | Feb. 13, 1934 |
| 2,254,934 | Brown | Sept. 2, 1941 |
| 2,521,795 | Kelley | Sept. 12, 1950 |
| 2,727,698 | Stevens | Dec. 20, 1955 |
| 2,793,817 | Clarke | May 28, 1957 |
| 2,832,055 | Bateman | Apr. 22, 1958 |
| 2,875,420 | Hoefer et al. | Feb. 24, 1959 |
| 2,902,889 | Trechsel | Sept. 8, 1959 |

FOREIGN PATENTS

| | | |
|---|---|---|
| 325,133 | France | Apr. 20, 1903 |
| 523,338 | Great Britain | July 11, 1940 |